United States Patent
Krajicek et al.

(10) Patent No.: US 10,387,851 B1
(45) Date of Patent: Aug. 20, 2019

(54) PAYING A REWARD TO A SECOND ACCOUNT BASED ON QUALIFICATIONS BEING MET BY A FIRST ACCOUNT

(75) Inventors: Gabriel M. Krajicek, Austin, TX (US); Don Shafer, Austin, TX (US); Timothy Leroy Eisenman, Austin, TX (US); Paul Rudolph Barton, Round Rock, TX (US); Shawn Chapman, Austin, TX (US)

(73) Assignee: KASASA, LTD., Austin, TX (US)

( * ) Notice: Subject to any disclaimer, the term of this patent is extended or adjusted under 35 U.S.C. 154(b) by 1195 days.

(21) Appl. No.: 12/572,252

(22) Filed: Oct. 1, 2009

Related U.S. Application Data

(63) Continuation-in-part of application No. 12/171,289, filed on Jul. 10, 2008.

(51) Int. Cl.
*G06Q 30/02* (2012.01)
*G06Q 20/06* (2012.01)
*G06Q 20/10* (2012.01)

(52) U.S. Cl.
CPC .......... *G06Q 20/06* (2013.01); *G06Q 20/108* (2013.01); *G06Q 30/0233* (2013.01)

(58) Field of Classification Search
CPC .................................................. G06Q 20/06
See application file for complete search history.

(56) References Cited

U.S. PATENT DOCUMENTS

| | | | | |
|---|---|---|---|---|
| 6,009,415 A | * | 12/1999 | Shurling | G06Q 30/02 705/35 |
| 6,018,718 A | * | 1/2000 | Walker | G06Q 20/10 705/14.17 |
| 6,070,160 A | * | 5/2000 | Geary | G06N 5/048 |
| 6,434,534 B1 | * | 8/2002 | Walker | G06Q 20/10 705/14.13 |
| 8,156,047 B1 | * | 4/2012 | Sanders | G06Q 20/10 705/14.17 |

(Continued)

FOREIGN PATENT DOCUMENTS

| WO | WO 02/073371 | * | 9/2002 |
| WO | WO 2005/010786 | * | 2/2005 |

OTHER PUBLICATIONS

City National Bank, retrieved at http://cnbt.com/free-reward-checking-p-4.html, Webarchive of Oct. 11, 2007.*

(Continued)

*Primary Examiner* — Abhishek Vyas
(74) *Attorney, Agent, or Firm* — Matheson Keys & Kordzik PLLC; Jerry M. Keys; Susan M. Maze

(57) ABSTRACT

Reward payments are applied to a first account and/or any linked second accounts at a financial institution. A computer program determines whether the first account qualifies for application of a reward, which may be a first alternate interest rate and/or a reward payment formula. The program communicates application of the reward to the first account and any linked second accounts for an accounting period applicable to the reward if the first account qualifies for the reward. In an event wherein the first account does not qualify for the reward, the program communicates application of the base interest rate to the first account and any linked second accounts for an accounting period applicable to the base interest rate.

35 Claims, 19 Drawing Sheets

(56) References Cited

U.S. PATENT DOCUMENTS

| | | | | |
|---|---|---|---|---|
| 8,452,645 | B2* | 5/2013 | Steinkamp | G06Q 30/0215 463/25 |
| 2003/0061097 | A1* | 3/2003 | Walker | G06Q 20/10 705/14.13 |
| 2003/0200144 | A1* | 10/2003 | Antonucci | G06Q 30/02 705/14.28 |
| 2004/0088216 | A1* | 5/2004 | Bangalore | G06Q 30/0222 705/14.23 |
| 2004/0122734 | A1* | 6/2004 | Schleicher | G06Q 30/02 705/14.27 |
| 2004/0122736 | A1* | 6/2004 | Strock | G06Q 30/02 705/14.31 |
| 2006/0074804 | A1* | 4/2006 | Cinar | G06Q 20/108 705/42 |
| 2007/0181674 | A1* | 8/2007 | Taylor | G06Q 20/10 235/381 |
| 2010/0312620 | A1* | 12/2010 | White | G06Q 30/02 705/14.1 |
| 2012/0316939 | A1* | 12/2012 | Moshfeghi | G06Q 30/02 705/14.16 |

OTHER PUBLICATIONS

Do US Consumers Benefit from Payment Card Referrals, Fumiko Hayashi, Mar. 2009.*
Do Rewards really create loyalty?; Jones, O'Brien; Jun. 1995.*

* cited by examiner

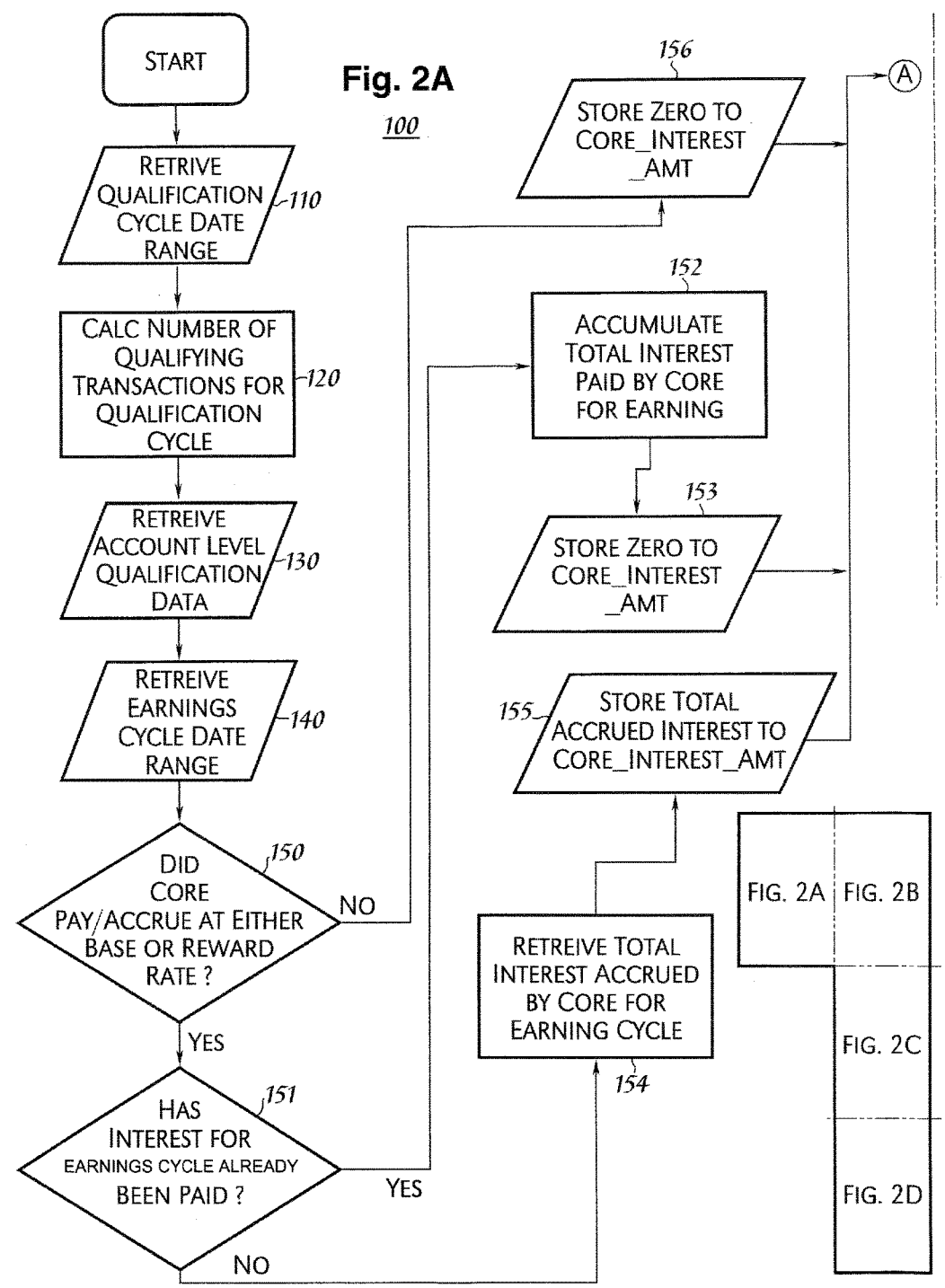

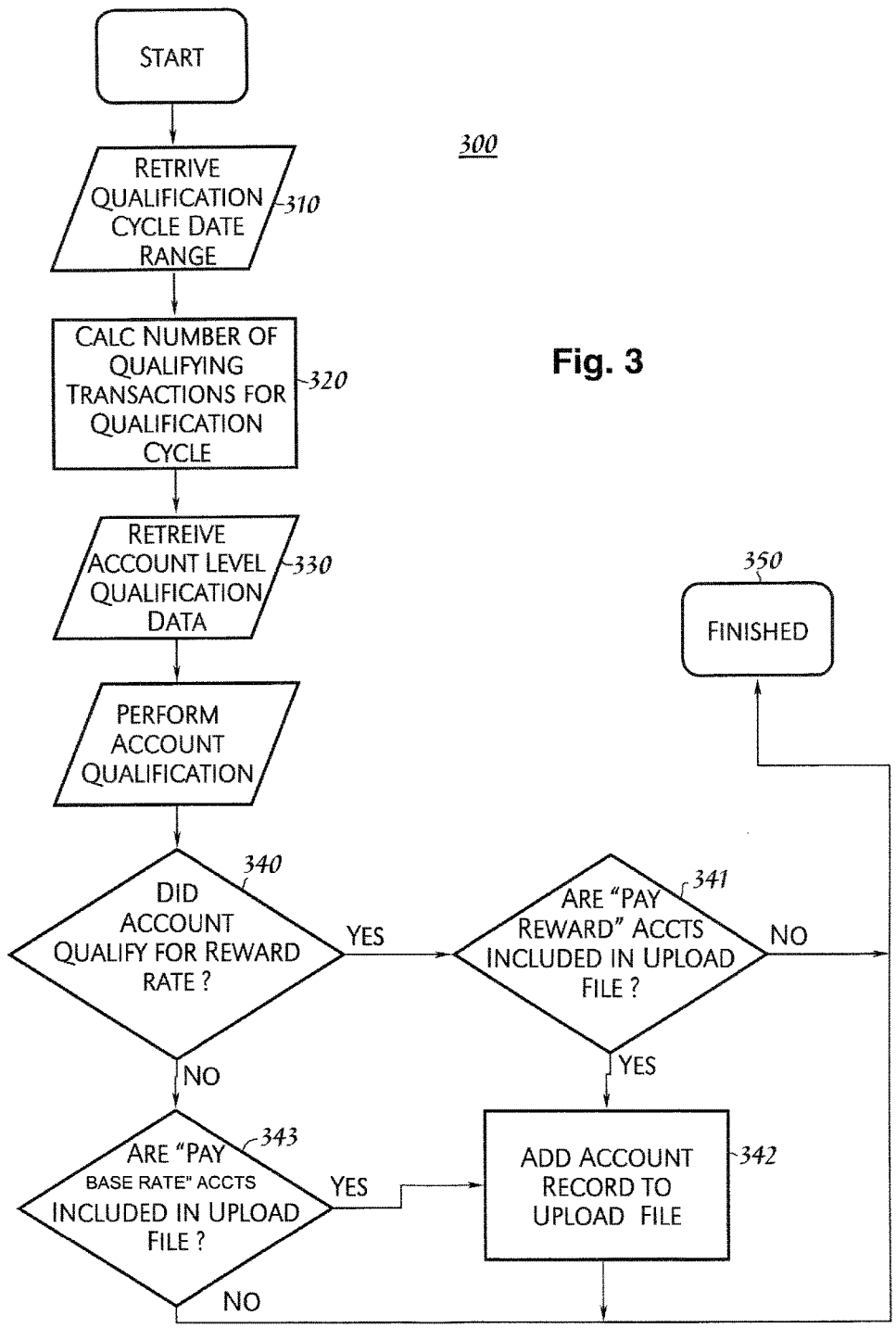

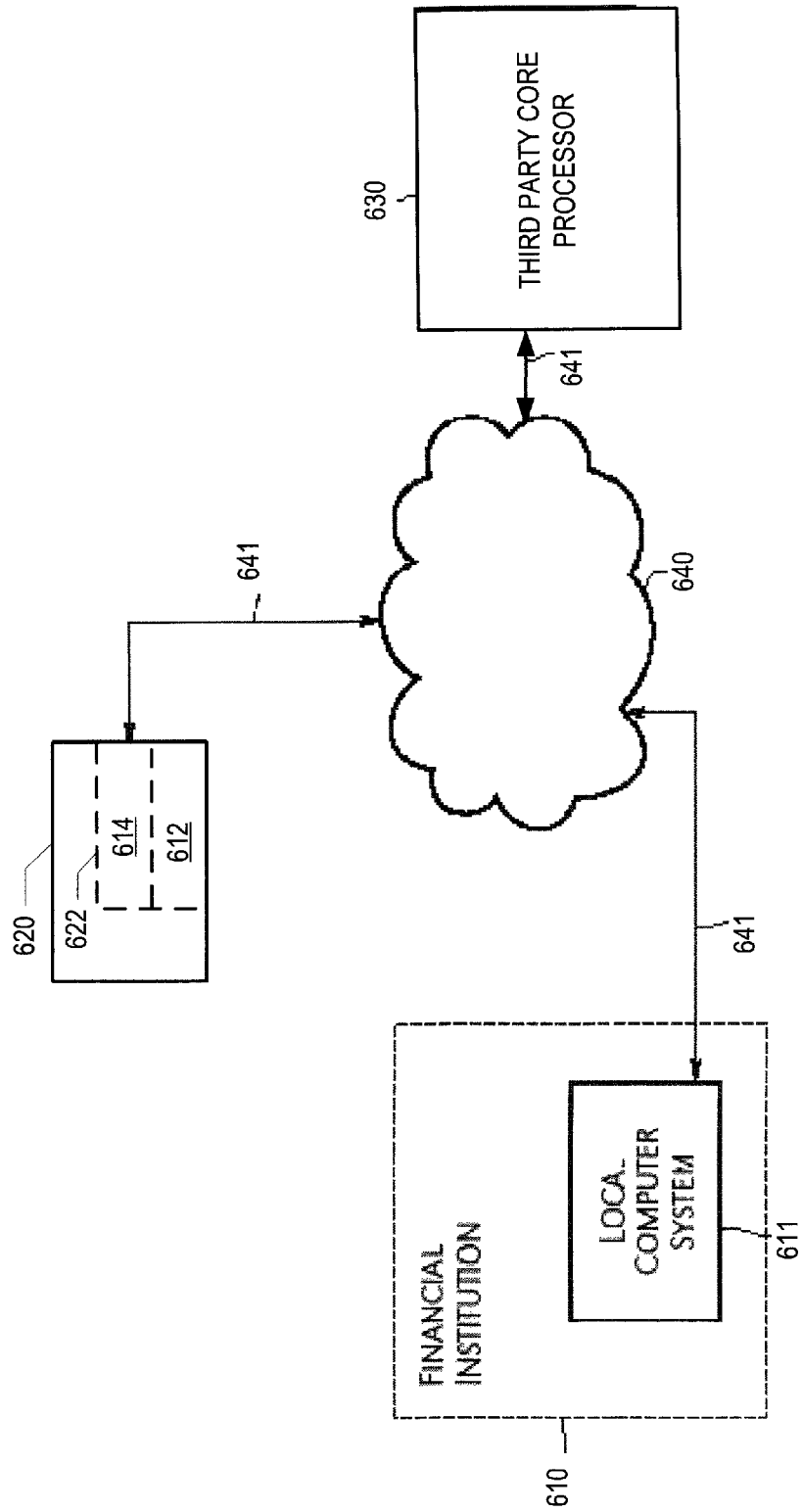

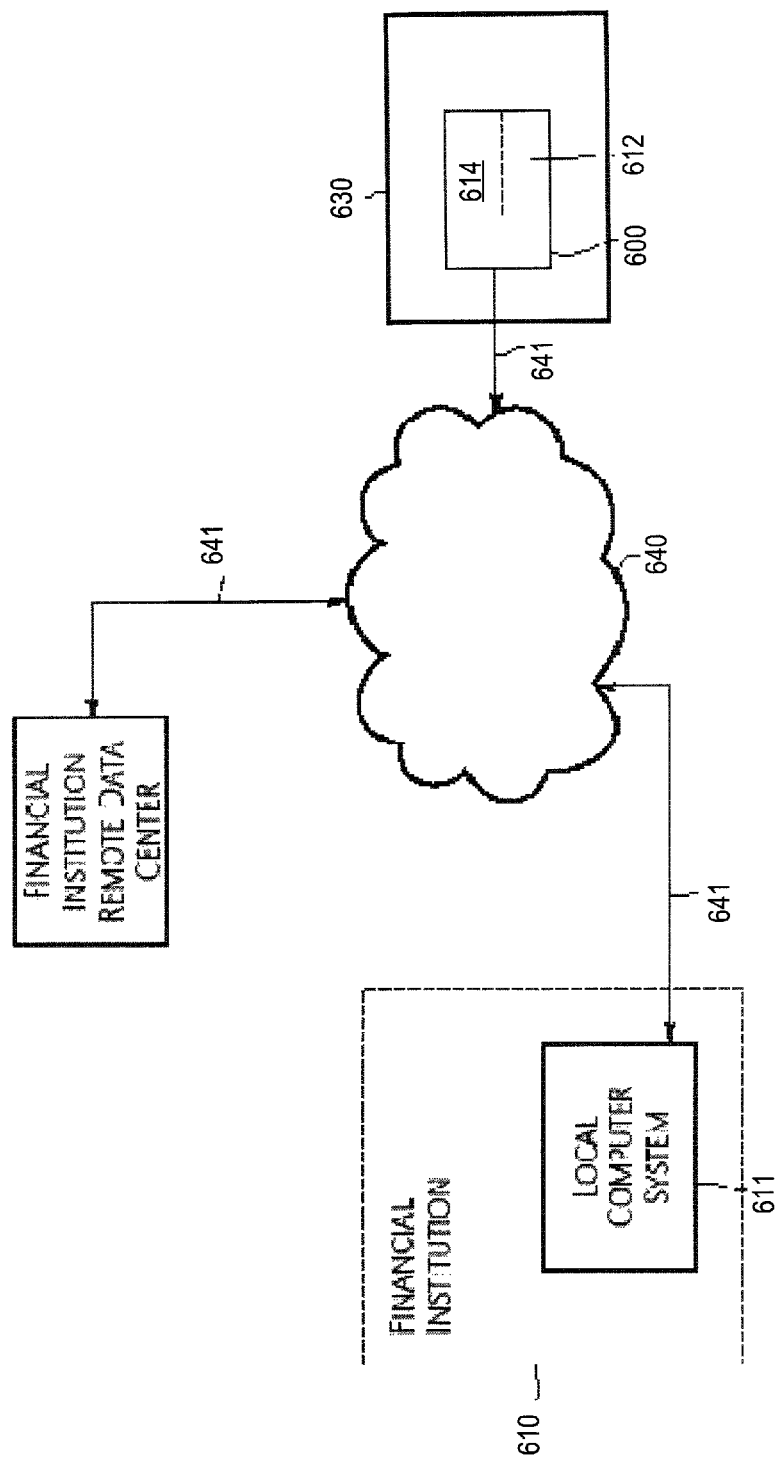

PAYING A REWARD TO A SECOND ACCOUNT BASED ON QUALIFICATIONS BEING MET BY A FIRST ACCOUNT

CROSS-REFERENCE TO RELATED APPLICATIONS

The present application is a continuation in part of U.S. patent application Ser. No. 12/171,289, entitled "PAYING ALTERNATE INTEREST RATES ON INTEREST BEARING ACCOUNTS," filed Jul. 10, 2008, which is herein incorporated by reference as if fully set forth in its entirety for its pertinent and supportive teachings.

This application claims priority pursuant to 35 U.S.C. 119 to provisional U.S. Patent Application Ser. No. 60/958,924 entitled "SYSTEMS AND METHODS FOR PAYING AN ALTERNATE INTEREST ON INTEREST BEARING ACCOUNTS" filed Jul. 10, 2007, which is hereby incorporated herein by reference.

The following co-pending and co-assigned application contains related information: U.S. patent application Ser. No. 11/828,097, entitled "METHOD, SYSTEM AND COMPUTER PROGRAM PRODUCT FOR CHARITABLE CHECKING, by inventors Donald Gordon Shafer, et al, filed Jul. 25, 2007, is hereby incorporated herein by reference.

BACKGROUND

Field of Invention

The present invention relates in general to systems, program products, and methods for determining the interest rate and/or an amount to pay or accredit to one or more depository financial institution accounts which are associated with an additional depository financial institution account that may qualify for a "reward" based upon transactional and qualifying factors and, more particularly, based upon qualification criteria and interpretive business rules other than minimum balance. Examples of rewards can include higher alternate interest rates and/or payments.

History of Related Art

The competitive marketplace for financial services is a constant source of innovation regarding financial products for consumers. In this context, a "consumer" or "customer" may include both a personal or commercial account at a bank, credit union, or other financial institution. Historically, interest in interest-bearing accounts was only tiered (if tiered at all) on the account holder's satisfaction of some minimum balance threshold. One more recent development was a deposit account—typically a checking account or other low/non-interest bearing account—that offered a "reward" interest rate. This reward interest rate was higher, sometimes significantly higher, than the market average for a similar type of account. A consumer, however, only earned the higher interest rate if they qualified for it. Qualification took on several forms, including some or all of the following: (1) maintaining a certain minimum account balance for a period of time (2) frequency of certain types of electronic transactions in the account, and other qualifications relating to the account. Typically, if the consumer did not qualify for the higher interest rate, the rate given to the account holder defaulted to none. Both the Federal Reserve and Federal Deposits Insurance Corporation (FDIC) questioned whether these types of accounts violated the Truth in Savings Act ("TSA"). The agencies opined that the accounts did not receive interest due to transactional infrequency. As part of their interpretation, the agencies determined that Comment 6 to Section 230.7 of Regulation DD implementing the TSA indicates that account dormancy is not a regulatory-compliant justification for a financial institution not to pay interest. The agencies argued that the only valid means of conditioning/qualifying an account holder's receipt of interest was on the satisfaction of a "minimum balance" requirement.

Accordingly, there is a need for financial services providers to come up with a new financial product that complies with the Federal Reserve and FDIC's interpretation of the TSA and Regulation DD.

Some large banks maintain their own proprietary data processing systems that reconcile and manage accounts, including providing the proper amount of interest to each account holder at the banks. Many community banks and credit unions, however, do not develop their own data processing software and/or operate their own data processing systems for reconciling and managing accounts for their customers and members, respectively, including providing the proper amount of interest paid or accrued to the account. Instead, such banks and credit unions utilize third-party "core processing" solutions. A "core processor" is a term of art in the financial services industry. The term refers to a processing system that specializes in account transactional reconciliation including but not limited to matching debit and credit transactions from activities such as cashing and writing checks, point-of-sale (POS) debits, and money transfers for an account holder at a financial institution. Thus, the core processing system is also typically tasked with determining the interest due on an account. Usually the financial institution sets guidelines and rules for when an account holder, upon holding an amount of money in an account for a given time period, will receive an interest rate of return. This is often advertised as the estimated annual percentage yield ("APY") for an account.

The third party core processors may facilitate core processing services to the financial institution by either (1) licensing the core processor software to the financial institution which operates the core processor software "in-house", meaning the software is hosted and operated at the financial institution's own data center, or (2) the core processing software is operated by the core processor in a "service bureau" environment, meaning the software is hosted remotely from the financial institution or its data center at a managed hosting facility operated by a provider (the core processor or a third party licensee) that typically provides core processing services to more than one financial institution. Unless the context indicates otherwise, for purposes of this application, "core processor", "core processing", and other similar terms are intended to cover "in-house" operated third party core processing software, third party "service bureau" core processing services, and financial institution "core processor-like" proprietary data processing systems. Regardless of whether the bank operates its own proprietary data processing systems or utilize a third party core processor solution for all or a portion of their processing needs, Federal laws require that the account owners and holders must be properly, promptly, accurately, and regularly informed of the status of their accounts, including earned amounts of interest on an interest-bearing account and estimated or actual APY on the balances held in the account. The core processing system is thus heavily involved in the application and determination of account balances and interest paid or accrued to an account. A third-party information provider, such as an Internet banking solutions provider, may also be involved in the process but only from the aspect that it provides information and not as a result of any determination of interest rates or amounts.

A need exists, therefore, to permit the processing of a regulatory-compliant reward in which the reward paid to the consumer account holder is conditioned on the account holder's periodic satisfaction of criteria other than just minimum balance. A need also exists to enable financial institution customers to earn rewards for one or more second accounts based on qualifying activity occurring in a first account. A need also exists for financial institution customers to be able to share reward amounts earned from a first account with one or more second accounts. A need also exists to implement methods and systems to effectively pay the desired reward in the form of an amount of interest and/or a payment to one or more of the account holder's accounts based upon financial institution-defined qualification criteria for a variety of software and hardware environments.

SUMMARY OF THE INVENTION

A method is implemented in a computer system for applying interest rates and/or reward payments to one or more accounts at a financial institution. Each account is potentially subject to a receiving a reward based on either qualifying activity occurring within that account or qualifying activity occurring with another associated or "linked" account. The method includes a) determining whether a first account qualifies for application of a reward payment formula in response to the account satisfying a first qualification criteria; b) determining whether the first account has any linked second accounts; c) calculating any rewards that are applicable to the first account and any linked second accounts for an accounting period applicable to the reward; d) determining how the rewards are to be credited; e) depositing all rewards directly into one or more of the linked second accounts; and f) in an event wherein the first account does not qualify for a reward, calculating interest for the first account and any linked second accounts using a base interest rate for an accounting period applicable to the base interest rate. The reward may be set by the financial institution, and may include a cash payment, an alternative interest rate or a combination of both.

Statements herein about determination or application of rewards and base and alternate rates are intended to imply determination or application of any of an unlimited number of reward payments and/or interest rates based on account holder satisfaction of an unlimited number of qualification criteria. Therefore, where it is stated herein, for example, that a determination is made whether an alternate interest rate and/or reward payment applies, this is not meant to preclude the possibility that a second alternate interest rate and/or reward payment may also be determined to apply, unless clearly stated otherwise.

Statements made herein about a method implemented in a computer system calculating application any rewards are intended to include an arrangement in which the computer system implementing the method communicates by affirmatively directing another computer system to apply the reward, and in which the computer system implementing the method effectively directs another computer system to apply the reward by not communicating to the other computer system.

In another aspect, a computer system determines in d) how the rewards are to be credited and in e) that all rewards are deposited into the first account on a first day and that all rewards are subsequently transferred from the first account and deposited into one or more of the linked second accounts on a second day. Alternatively, a computer system determines in d) how the rewards are to be credited and in e) that all rewards are deposited into the first account on a first day and only rewards earned by linked second accounts are subsequently transferred from the first account and deposited into one or more of the linked second accounts on a second day. Alternatively, a computer system determines in d) how the rewards are to be credited and in e) that all rewards are directly deposited into the account in which each reward was earned. Alternatively, a computer system determines in d) how the rewards are to be credited and in e) that a portion of the rewards is deposited into the first account and a portion of the rewards is deposited directly into one or more of the linked second accounts.

In another aspect, a), b), c), d), e), and f) are performed by a core processor and calculating of rewards and interest in c) and f) includes a first process or routine executing in the core processor communicating with a second process or routine executing in the core processor.

In another aspect, a), b), c), d), e), and f) are performed by a program executing remotely from a core processor. The calculating of rewards and interest in c) and f) includes the remotely executing program sending an instruction to the core processor. If the instruction has a first code, the instruction directs the core processor to calculate any rewards, so that the first account and the linked second accounts net at least the reward, which may be an alternative interest rate and/or a reward payment for the accounting period. If the instruction has a second code the instruction directs the core processor to apply the base interest rate, so that the first account and the linked second accounts net at least the base interest rate for the accounting period.

In another aspect, a), b), c), d), e), and f) are performed by a program executing remotely from a core processor and the calculating in c) and f) includes the remotely executing program directing the core processor to calculate one or more rewards, wherein the core processor applies one or more reward payment formulas.

It should be understood that "reward payment formulas" in this context refers to a mathematical formula based on one or more types of account activities and/or balances, and that directing the core processor to apply a "reward payment formula" in this context refers to calculating a reward payment amount, which can include calculating interest at an alternative rate, making a predetermined payment, or a combination of both. The reward payment formula is indicated by some aspect of the instruction, such as a code included therein. That is, the core processor looks up a reward payment formula corresponding to the reward type communicated to the core processor in the instruction.

Directing the core processor to apply one or more reward payment formulas may be done by the remotely executing program sending an instruction to the core processor. If the instruction has a first code, the instruction directs the core processor to apply a reward payment formula, so that the first account and its linked second accounts net at least the reward payment for the accounting period. If the instruction has a second code, the instruction directs the core processor to apply the base interest rate, so that the first account and its linked second accounts net at least the base interest rate for the accounting period.

In another aspect, a), b), c), d), e), and f) are performed by a program executing remotely from a core processor and the core processor does not accrue nor pay interest. The remotely executing program computes a transaction amount. Also, d) includes sending a transaction for the computed transaction amount to the core processor, wherein the transaction is such that processing of the transaction by the core processor nets at least the reward payment to the first account and its linked second accounts for an accounting period if a) determined the first account qualifies for application of the reward payment. Further, f) includes sending a transaction for the computed transaction amount to the core processor, wherein the transaction is such that processing of the transaction by the core processor nets at least the base interest rate to the first account and its linked second accounts for an accounting period if a) determined the first account qualifies for application of the base interest rate.

In another aspect, a), b), c), d), e), and f) are performed by a program executing remotely from a core processor and the calculating in c) includes the remotely executing program notifying the core processor of a selected one or more reward payment formulas for the core processor to apply.

In another aspect, a), b), c), d), e), and f) are performed by a program executing remotely from a core processor. The remotely executing program determines respective reward payments for the reward payment formulas. The remotely executing program computes an adjustment amount responsive to the determining in a), wherein the calculating in c) and f) includes the remotely executing program sending the computed adjustment amount to the core processor for the core processor to apply to an amount already accrued or paid by the core processor.

In another aspect, a), b), c), d), e), and f) are performed by a program executing remotely from a core processor, and the method includes the remotely executing program determining the base interest rate responsive to three lowest checking rates in a local market.

In another aspect, a), b), c), d), e), and f) are performed by a program executing remotely from a core processor. The remotely executing program determines respective reward payments for the reward payment formulas. The remotely executing program computes a replacement amount responsive to the determining in a). The determining in d) includes the remotely executing program sending the computed replacement amount to the core processor for the core processor to apply as a replacement amount in lieu of an amount already accrued or paid by the core processor.

In another aspect, applying a reward payment formula includes accruing an interest amount.

In another aspect, applying a reward payment formula includes paying an interest amount.

In another aspect, the accounting period is a qualification period, the determining in a) is for the qualification period, and the qualification period corresponds with a statement cycle period.

In another aspect, the accounting period is a qualification period, the determining in a) is for the qualification period, and the qualification period is asynchronous with respect to statement cycle period.

In another aspect, the qualification period is asynchronous by n days with respect to the statement cycle period.

In another aspect, the qualification period is asynchronous by one statement cycle period with respect to the statement cycle period.

In another aspect, the reward payment qualification criteria include one or more account qualification criteria and one or more account transaction qualification criteria.

In another aspect, the reward payment qualification criteria comprise one or more criteria selected from a group. The group can include, but is not limited to the following:
  electronic receipt of account statements;
  an e-mail address;
  previous logging on to an Internet website;
  meeting a minimum number of debit card transactions;
  maintaining a minimum account balance;
  meeting a certain number of direct deposits;
  performing a number of bill pay transactions;
  limiting the number of non-electronic transactions to the account;
  referring a friend to the financial institution;
  maintaining a qualifying deposit or loan account at the financial institution (relationship); and
  maintaining a qualifying loan amount.

In another aspect, the one or more account transaction criteria comprise one or more criteria selected from a group. The group can include, but is not limited to the following:
  a specified minimum number of debit card transactions;
  a specified minimum number of ATM withdrawals;
  a specified number of bill pay transactions;
  a specified number of direct deposits; and
  a specified number of direct debits.

In another aspect, the method includes determining whether a reward payment applies to the account for the accounting period responsive to one or more break point criteria. The one or more break point criteria include one or more criteria wherein the account balance exceeds a predetermined maximum balance for the period.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The foregoing summary as well as the following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views. FIGS. 1-4 of the parent application and the accompanying detailed descriptions thereof are herein incorporated by reference.

Figure 1A:
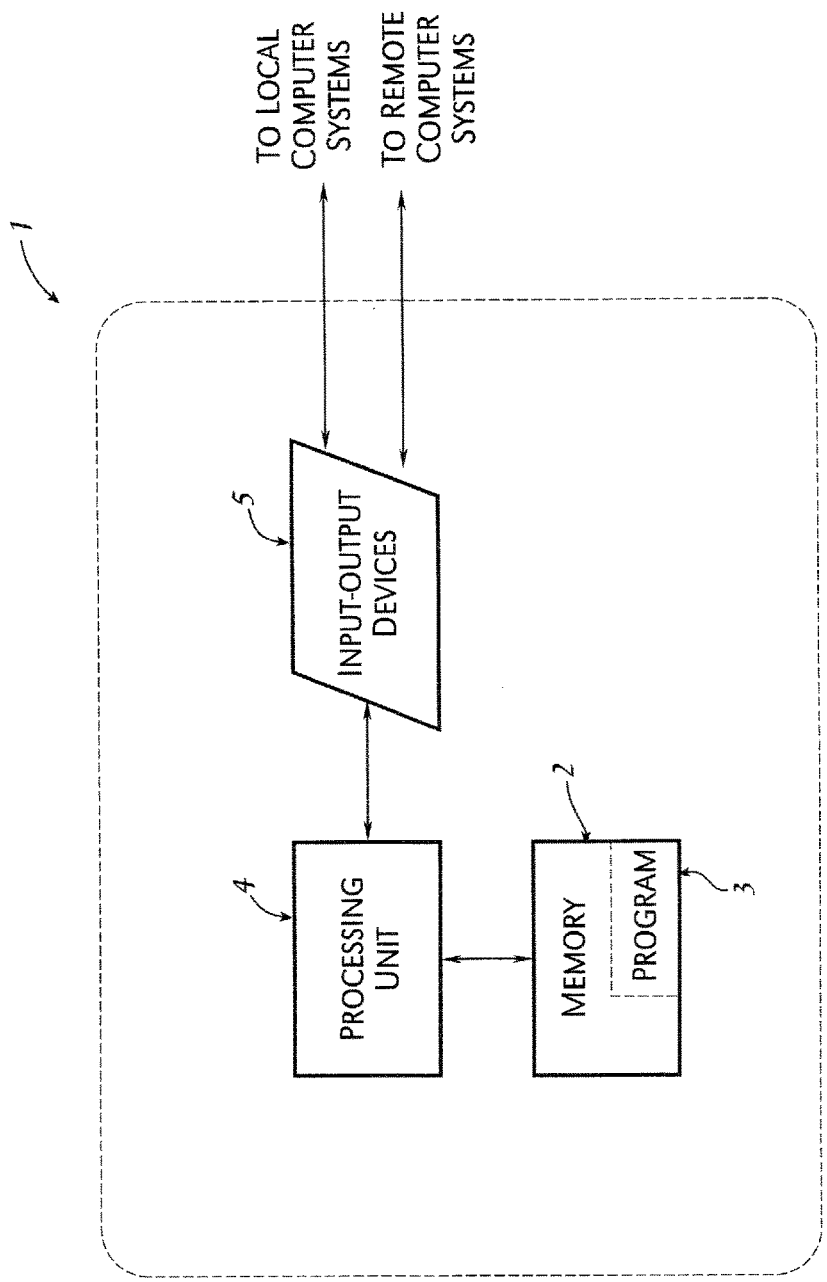
Figure 1B:
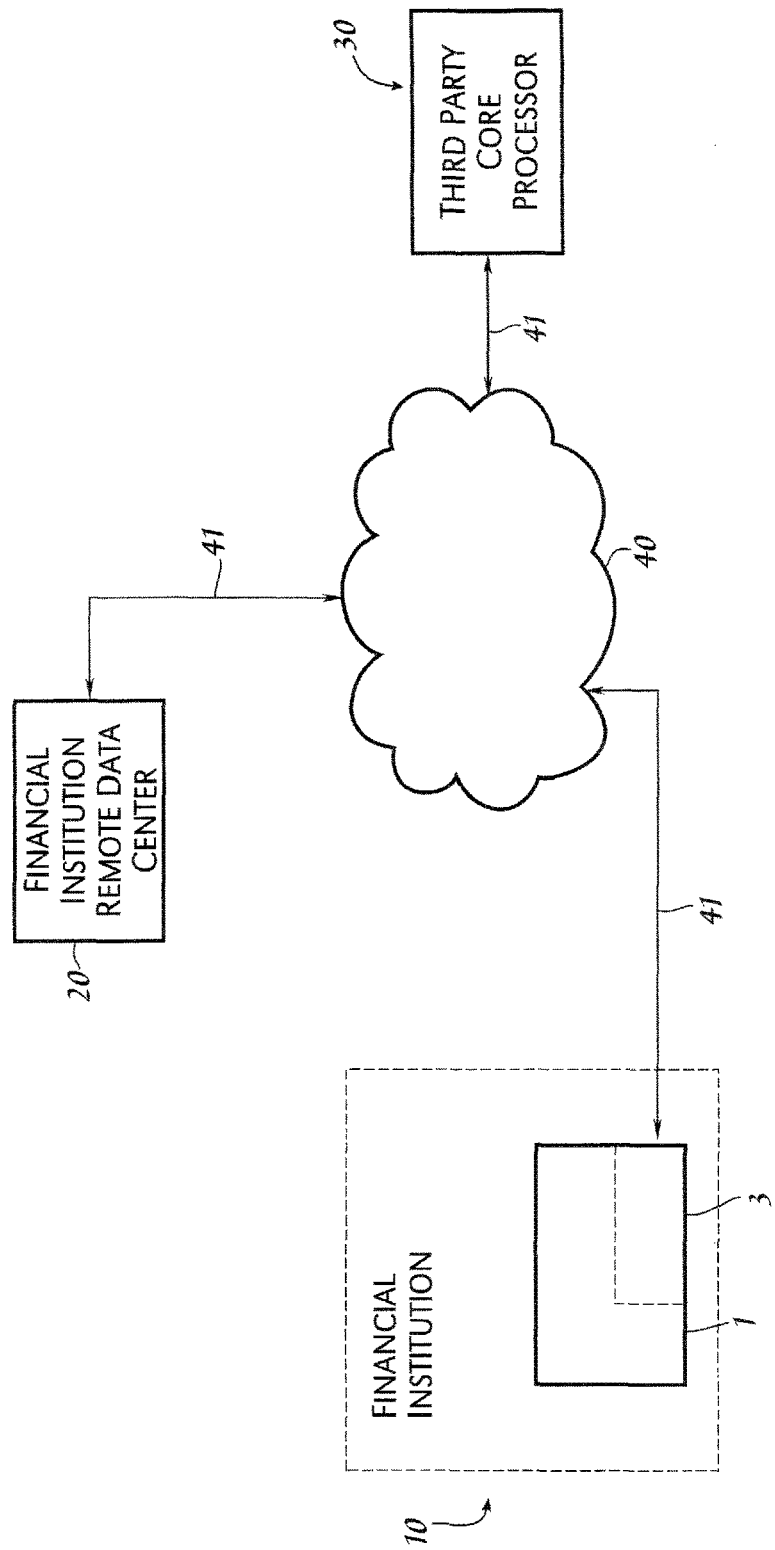
Figure 1C:
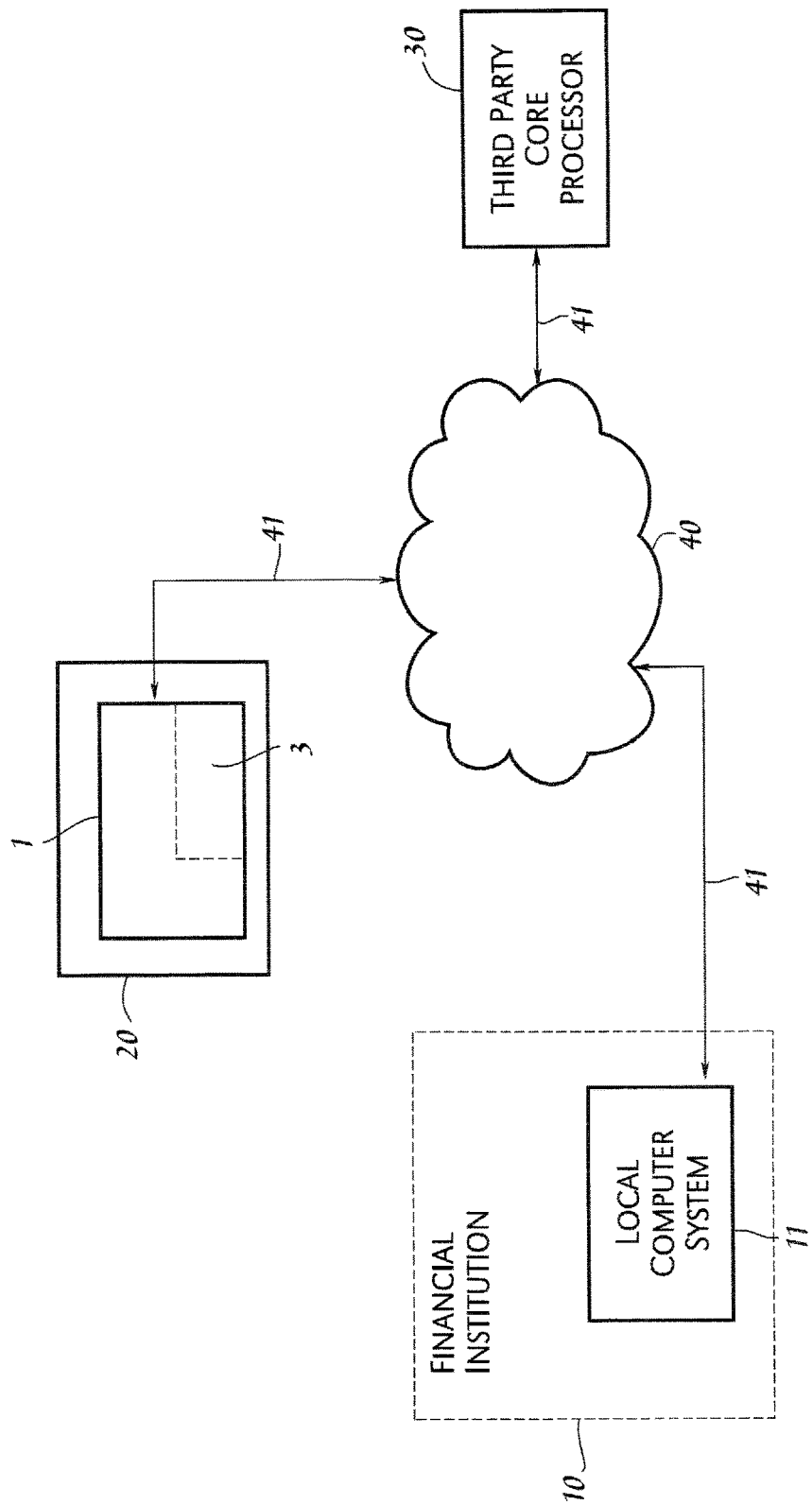
Figure 1D:
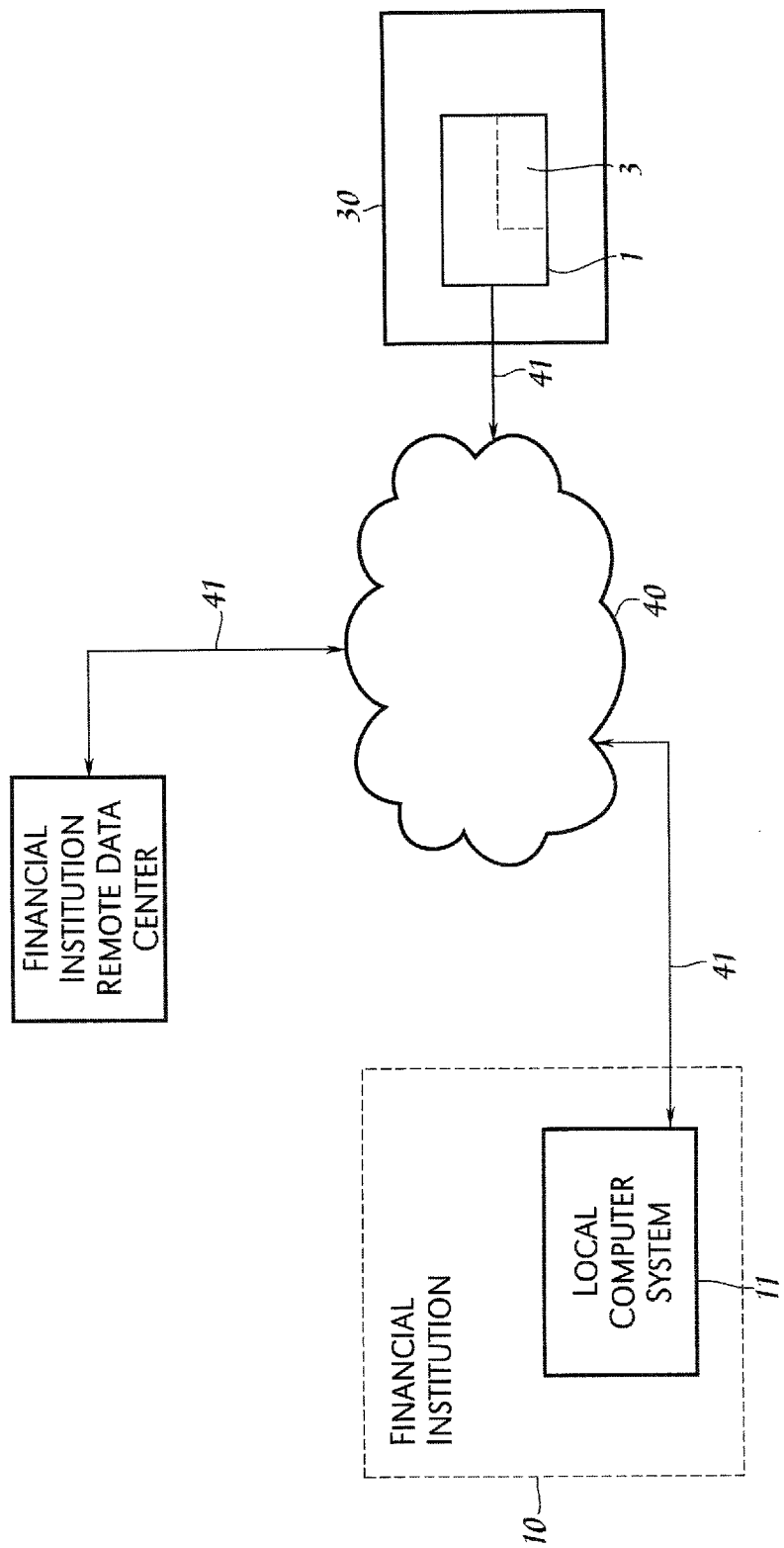
Figure 2B:
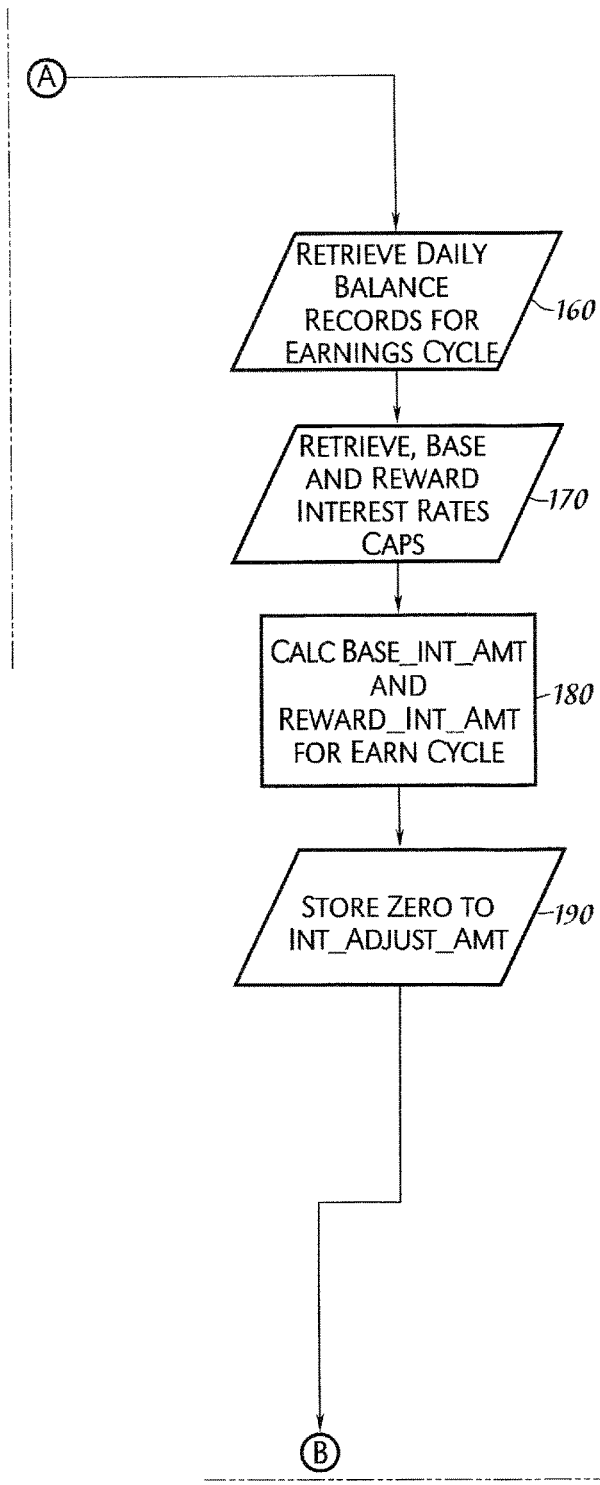
Figure 2C:
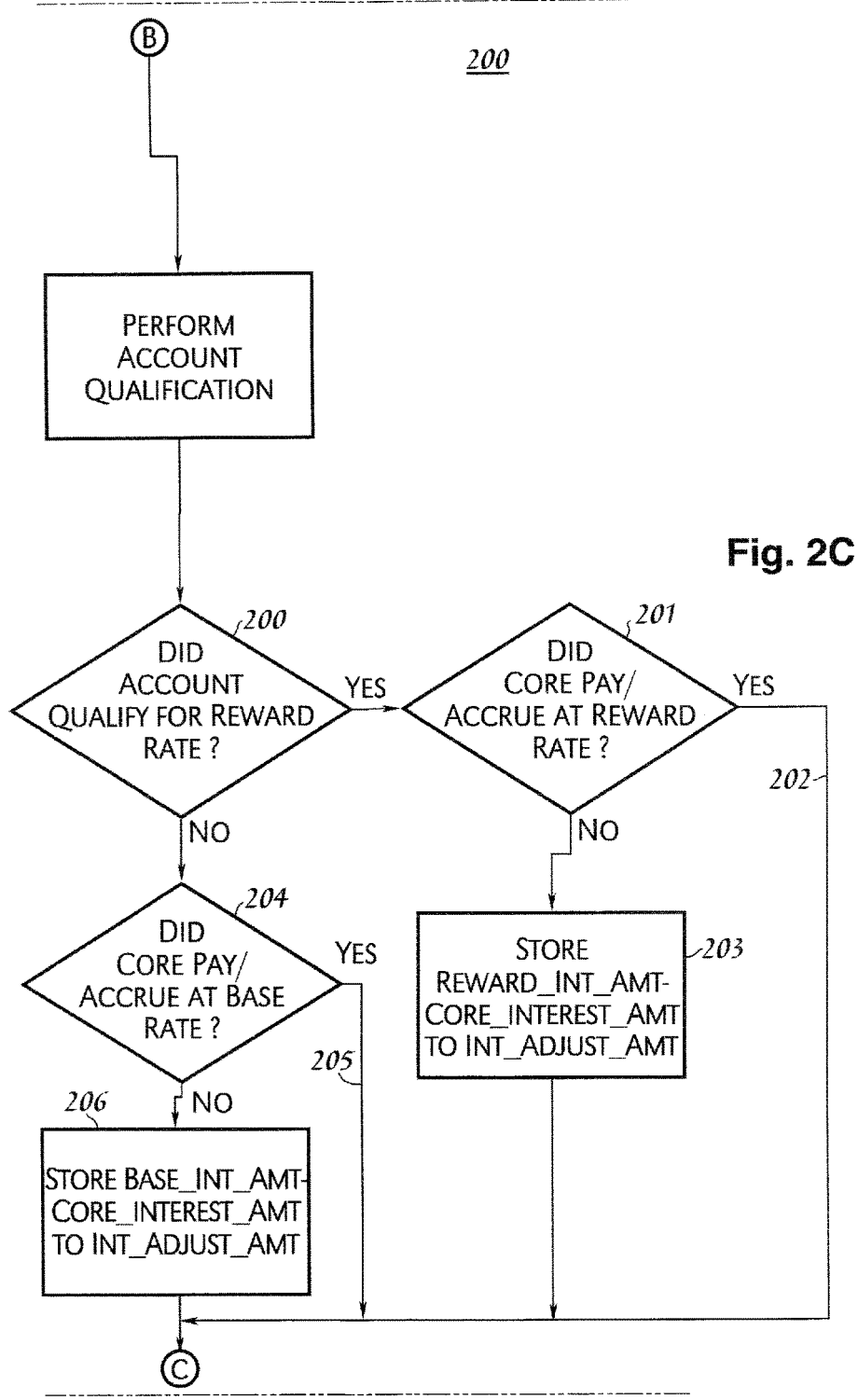
Figure 2D:
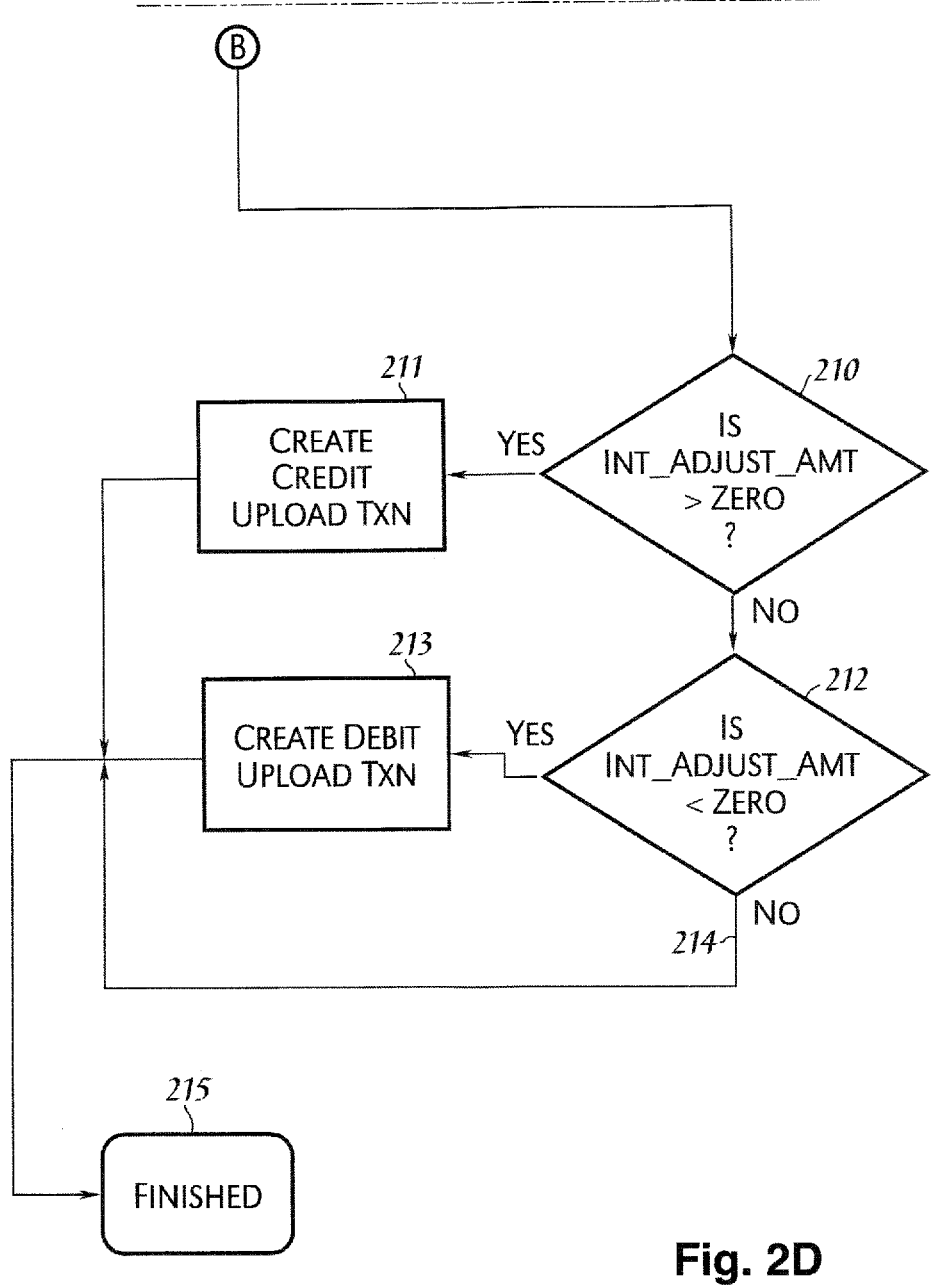
Figure 4:
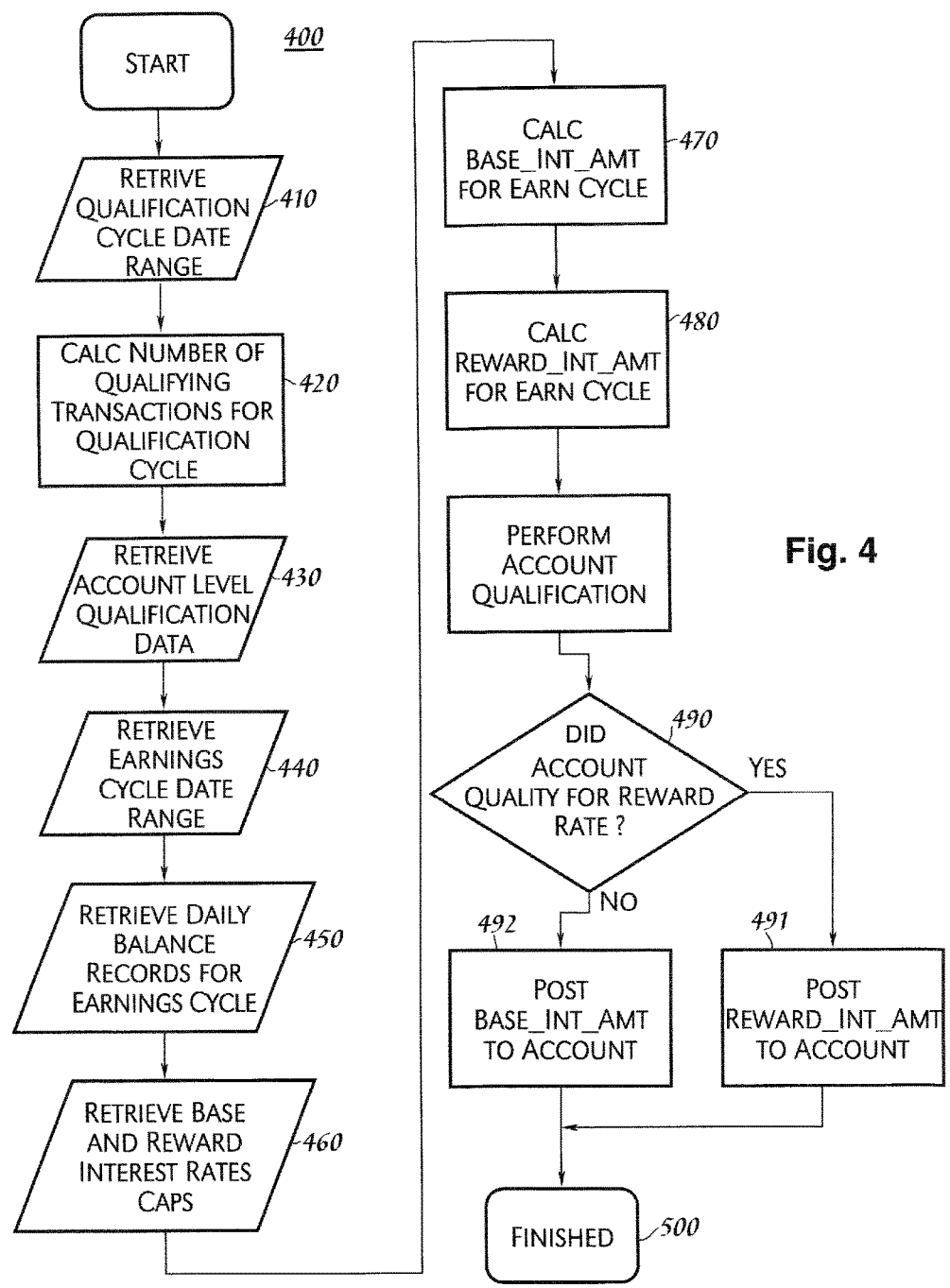
Figure 5A:
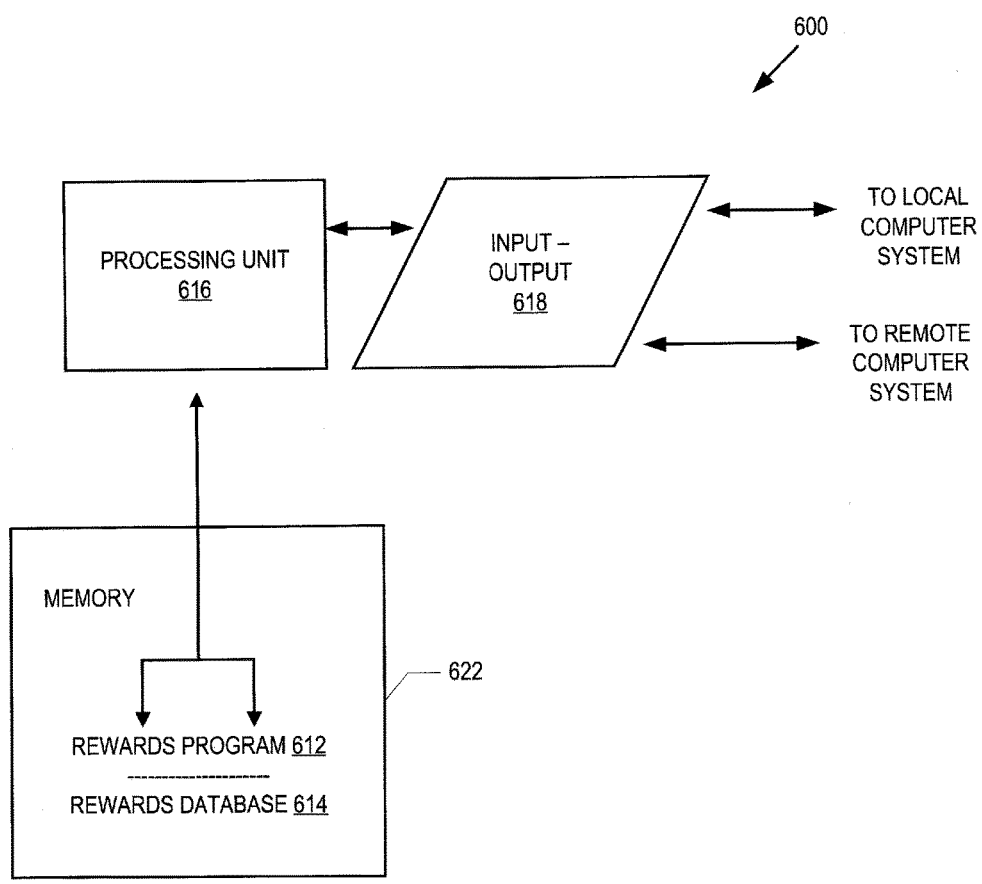
Figure 5B:
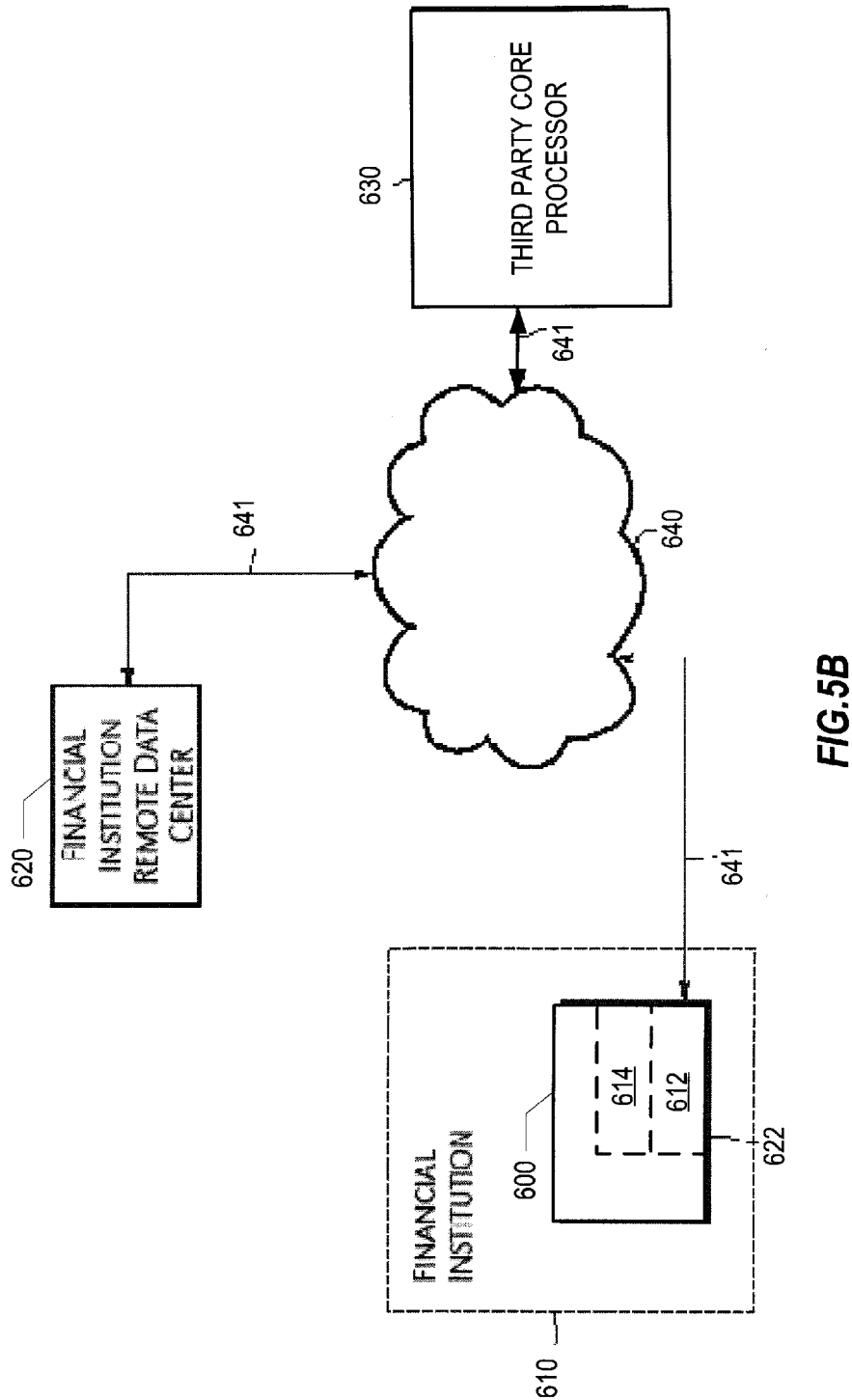
Figure 6:
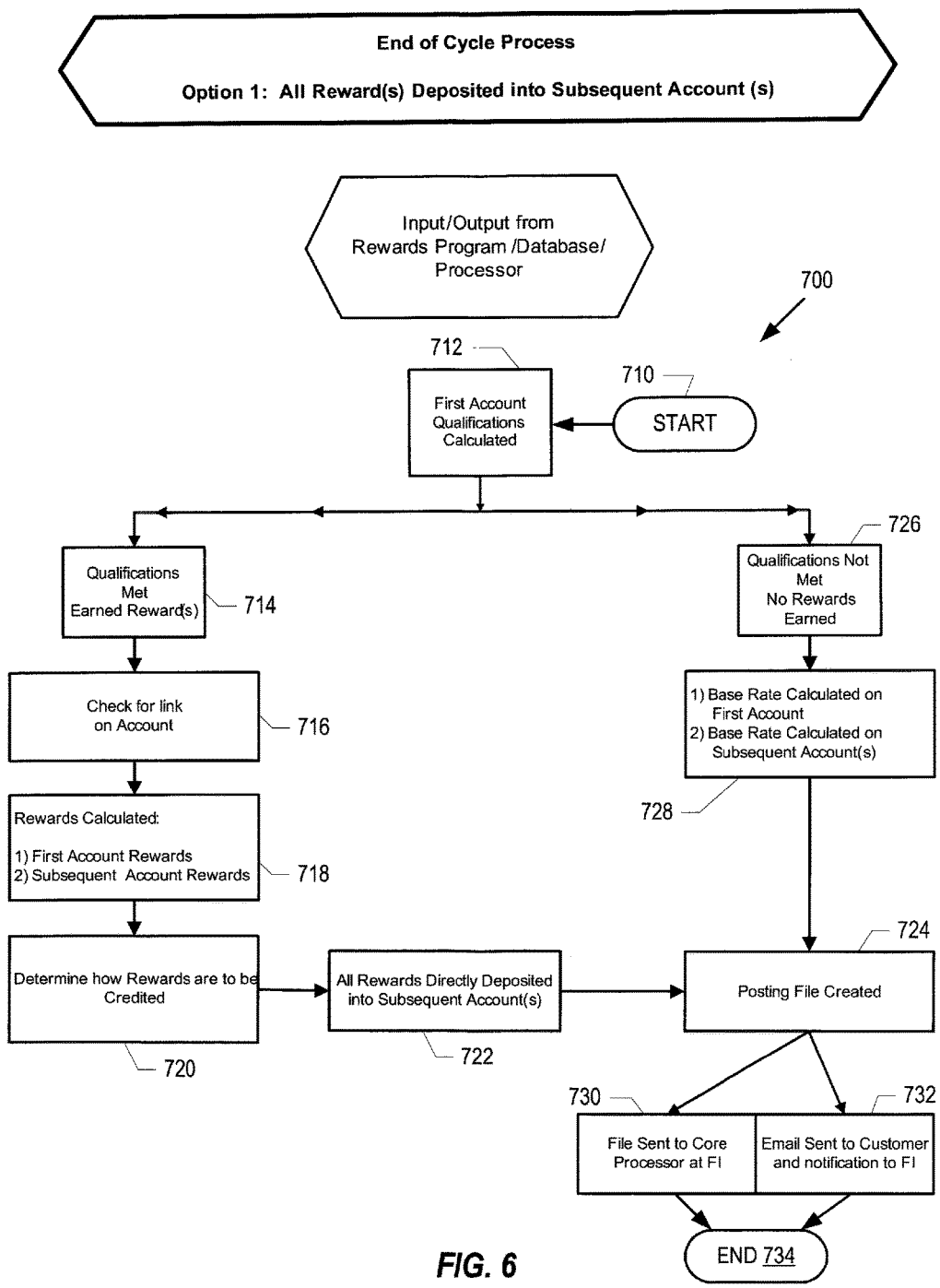
Figure 8:
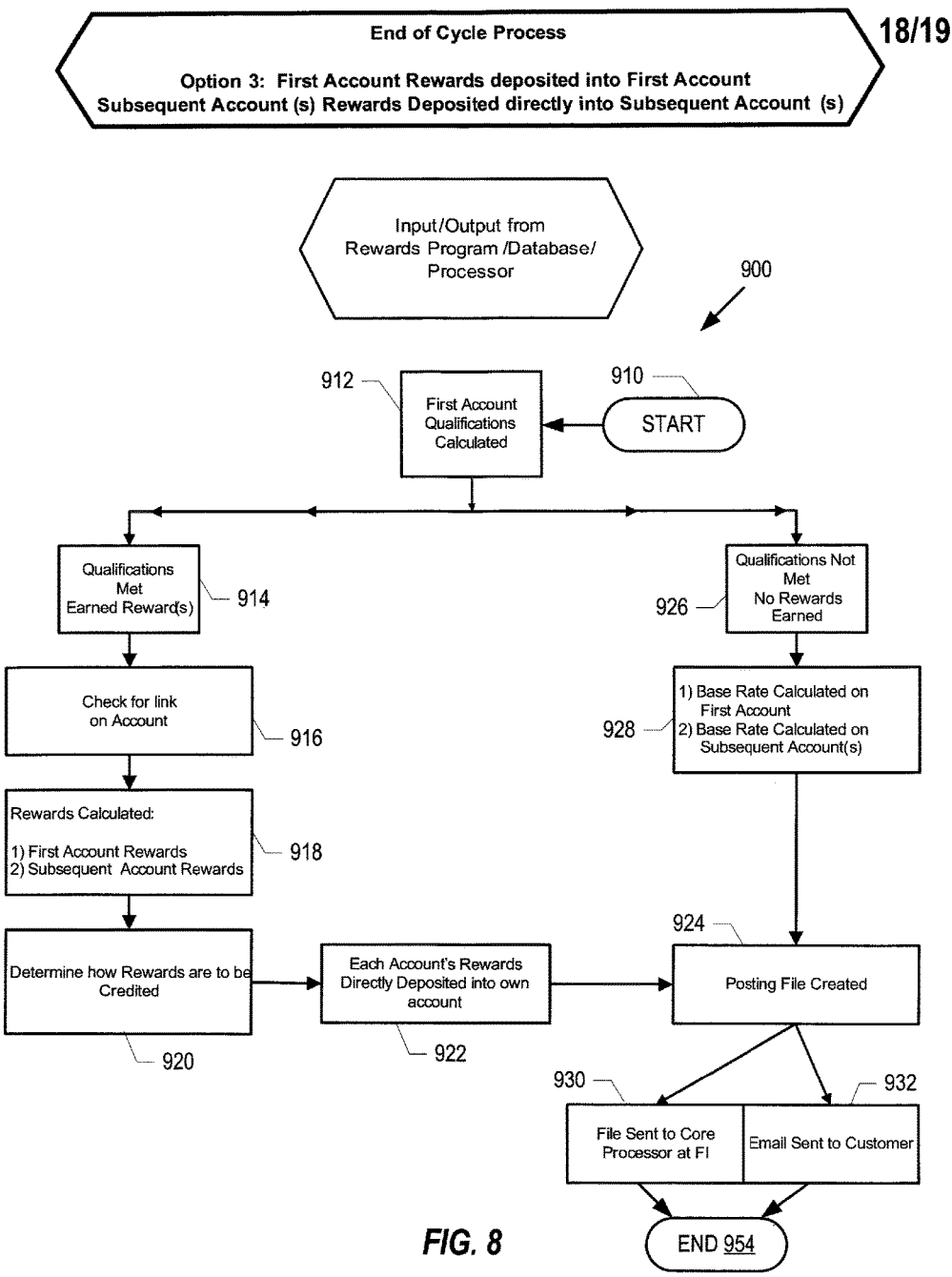
Figure 9:
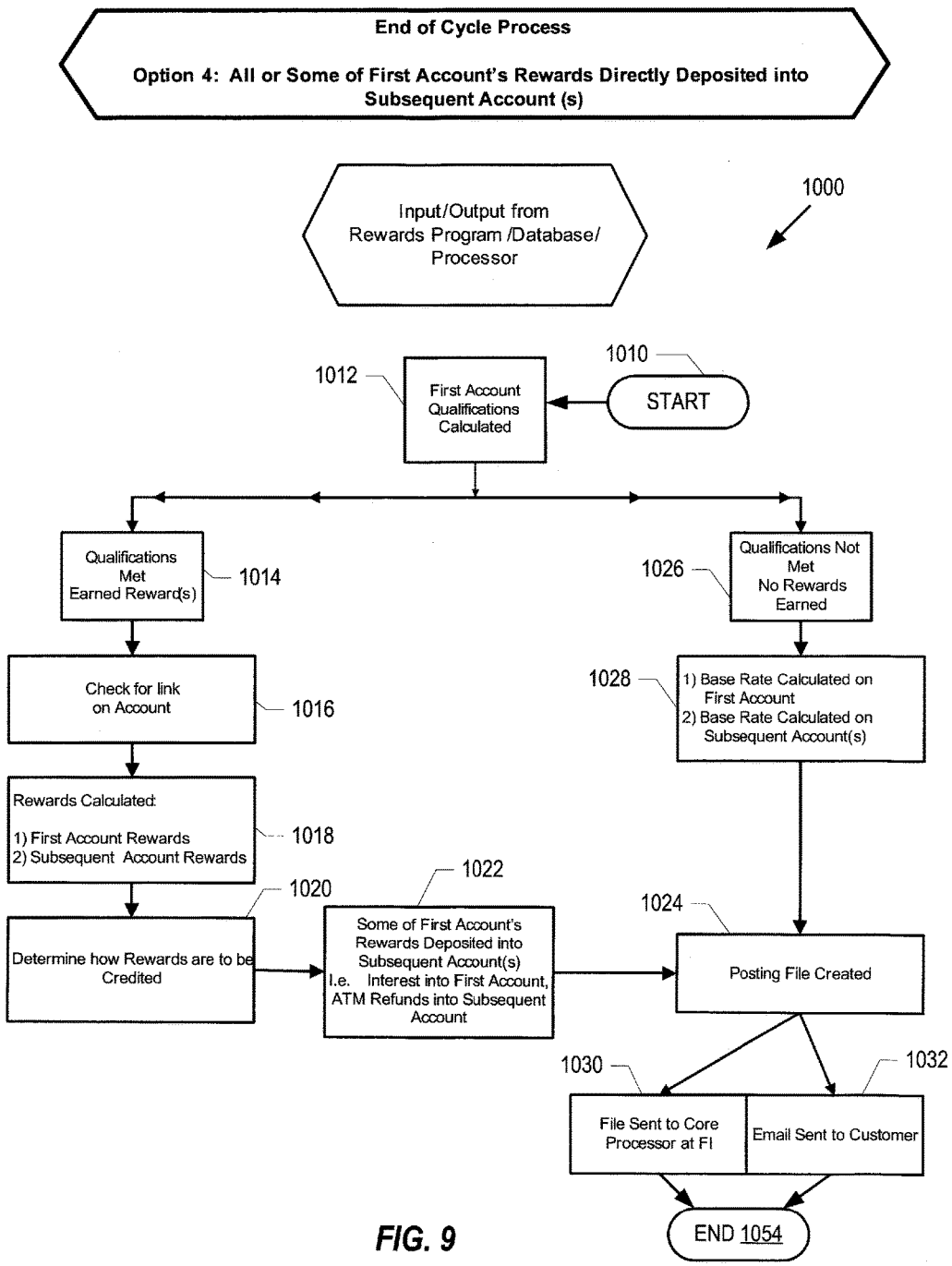

The invention may take physical form in certain parts and arrangement of parts. For a more complete understanding of the present invention, and the advantages thereof, reference is now made to the following descriptions taken in conjunction with the accompanying drawings, in which:

FIG. 1a is an illustration of an embodiment for a system in which an application resides and wherein the application is for determining the applicable interest rate for an alternate interest bearing account;

FIG. 1b is an illustration of an embodiment for a system wherein the application for determining the applicable interest rate resides at a financial institution;

FIG. 1c is an illustration of an embodiment for a system wherein the application for determining the applicable interest rate resides at a financial institution's remote data processing center;

FIG. 1d is an illustration of an embodiment for a system wherein the application resides at a third-party core processor or service bureau;

FIG. 2 is a process flow diagram for a method wherein the application qualifies an alternate interest rate account for an alternate interest rate and adjusts the amount of interest paid or accrued by a core processor;

FIG. 3 is a process flow diagram for a method wherein the application qualifies an alternate interest rate account for an alternate interest rate and communicates a code to the core processor as to which interest rate to pay or accrue; and FIG. 4 is a process flow diagram of a method wherein a core processor, on behalf of the financial institution, qualifies an alternate interest rate account for a alternate interest rate and pays the applicable amount of interest;

FIG. 5a is an illustration of an embodiment for a system in which an application resides and wherein the application is for determining the reward payment for a first account with one or more linked second accounts;

FIG. 5b is an illustration of an embodiment for a system wherein the application for determining the reward payment resides at a financial institution;

FIG. 5c is an illustration of an embodiment for a system wherein the application for determining the reward payment resides at a financial institution's remote data processing center;

FIG. 5d is an illustration of an embodiment for a system wherein the application for determining the reward payment resides at a third-party core processor or service bureau;

FIG. 6 is a process flow diagram for a method wherein the application qualifies a first account for a reward payment, calculates the reward payment, and instructs a core processor to deposit the reward payment into one or more second accounts linked to the first account;

FIG. 7 is a process flow diagram for a method wherein the application qualifies a first account for a reward payment, calculates the reward payment, instructs a core processor to initially deposit the reward payment into the first account on a first day, and instructs a core processor to subsequently transfer either all of the rewards or only the rewards earned by one or more second accounts linked to the first account to one or more of the second accounts linked to the first account;

FIG. 8 is a process flow diagram for a method wherein the application qualifies a first account for a reward payment, calculates the reward payment, and instructs a core processor to deposit the reward payment directly into the account in which each payment was earned; and FIG. 9 is a process flow diagram for a method wherein the application qualifies a first account for a reward payment, calculates the reward payment, and instructs a core processor to deposit some of the reward payment into the first account and some of the reward payment into one or more of the second accounts linked to the first account.

DETAILED DESCRIPTION OF THE ILLUSTRATIVE EMBODIMENTS

The principles of the presented embodiments and their advantages are best understood by referring to FIGS. 1-9.

In the following descriptions and examples, specific details may be set forth such as specific quantities, sizes, etc., to provide a thorough understanding of the presented embodiments. However, it will be obvious to those of ordinary skill and creativity in the art that the embodiments may be practiced without such specific details. In many cases, details concerning such considerations and the like have been omitted inasmuch as the details are not necessary to obtain a complete understanding of any and all the embodiments and are within the skills and creativity of persons of ordinary skill in the relevant art.

Unless the context indicates otherwise, for purposes of this application, "financial institution" shall be any entity that pays interest on an account, including, but not limited to, a bank or a credit union.

Unless the context indicates otherwise, for purposes of this application, an "adjustment" shall mean any reward payment, whether posted to an account or accrued to be paid to an account and which can be a partial or full amount; i.e., an adjustment credit to pay the full reward amount or an amount to increase what has already been paid or accrued or an adjustment debit to deduct the full reward amount or an amount to decrease an already paid or accrued amount.

In the embodiments, systems, program products, and methods for providing applying interest rates and/or reward payments to one or more accounts at a financial institution are disclosed. Briefly, such an account at a financial institution may qualify for one or more predetermined alternate interest rates and/or reward payments, including a predetermined "base" rate of interest. Qualification criteria are established for each alternate interest rate and/or reward payment. If the account satisfies the qualification criteria for the application of an alternate interest rate and/or reward payment during the applicable accounting period for determining the payment, the financial institution pays the applicable alternate rate of interest and/or reward payment, for example, on the average account balance or the number of ATM transactions. If the account does not satisfy the qualification criteria for receiving the alternate interest rate and/or reward payment and there is no other alternate interest rate other than the base interest rate, the financial institution pays the base interest rate on the account principal during the applicable accounting period. Application software for determining if an account holder qualifies for an alternate interest rate and/or reward payment and determining which alternate interest rate and/or reward payment is to be paid on an account during an accounting period may be located on a computer system located at the financial institution, remotely at the institution's proprietary data processing center, at a third-party core processor data center, or at a third party service provider who provides services to the financial institution to carry out the method of the present invention. It should be understood that reward payments can have reward payment formulas according to the embodiments, systems, program products, and methods described herein. That is, in an embodiment X of the invention, for example: reward payments are tiered based on account balances, such as $1-$10,000=Rate A; $10,001-$25,000=Rate B; and >$25,000=Rate C. In an embodiment BB, for example, reward payments are based on specific account activity or qualifications levels. As an example of embodiment Y: Qualification A=Payment A; Qualification A+B=Payment B; Qualification A+B+C=Payment C; and so on. As another example of embodiment Y: Use debit card 10 times, earn Payment A. Each use of a debit card thereafter, earns an additional reward payment up to a maximum amount, or unlimited. Further, embodiments X and Y are not mutually exclusive. That is, another embodiment of the invention combines some or all aspects of both embodiments X and Y described immediately above. (It should be understood that the embodiment Y described immediately above must always pay at least a non-qualifying rate to comply with FDIC regulations.)

The following table further illustrates the above. This table illustrates examples of rate plans and rate types, wherein Example X is a rate plan and Rates A, B, C, etc. are rate types that have corresponding rate levels.

TABLE ONE

|  | 0-$10,000 | $10,001-$25,000 | >$25,000 |
|---|---|---|---|
| EXAMPLE X of a. and b. combined | | | |
| Qualification Activity A | Rate A | Rate D | Rate E |
| Qualification Activity B | Rate B | Rate F | Rate G |
| Qualification Activity A + B | Rate C | Rate H | Rate I |
| Qualification Activity A + B + C | Rate D | Rate J | Rate K |
| EXAMPLE Y of a. and b. combined | | | |
| Qualification Activity A | Rate A + .10% | Rate B + .10% | Rate C + .10% |
| Qualification Activity B | Rate A + .10% | Rate B + .10% | Rate C + .10% |
| Qualification Activity A + B | Rate A + .25% | Rate B + .25% | Rate C + .25% |
| Qualification Activity A + B + C | Rate A + .50% | Rate B + .50% | Rate C + .50% |

In embodiments where the account may receive more than one alternate interest rate and/or reward payment as well as a base interest rate, the qualification criteria for the second alternate interest rate and/or reward payment may vary from the qualification criteria for the first alternate interest rate. For example, the qualification criteria for the second alternate interest rate and/or reward payment may be less stringent on the account holder or less favorable to the financial institution as will be discussed in more detail below. In such an embodiment, if the account satisfied the qualification criteria for the application of the second alternate interest rate and/or reward payment during the applicable accounting period for determining the payment, the financial institution pays the applicable second alternate rate of interest and/or reward payment on the average account balance even though the account is not entitled to receive the first alternate interest rate and/or reward payment. Alternately, the second alternate interest rate and/or reward payment could be a higher rate and the account could qualify for both the first and second alternate interest rates and/or reward payments. In this scenario, the account would be entitled to receive the highest of the available rates and/or reward payments or the sum of both interest rates and/or reward payments.

Typically, the account holders of an account at a financial institution either are paid a higher-than-market "reward" interest rate and/or reward payment, or a "base" rate of interest. Unlike the previous account designs, if an account holder does not qualify for the reward rate and/or reward payment, the owner or holder is still guaranteed a base interest rate of earnings on the account principal (assuming that the principal is above a required account minimum amount for paying interest, if so required). Additionally, the qualification criteria for obtaining the reward interest rate and/or payment is decoupled from the minimum account balance amount, thereby avoiding regulatory concern of what actions would allow an owner or holder of an account to qualify for the reward interest rate and/or reward payment. Application software for computing the interest and/or reward payment to be paid to the account holder or owner may be located locally at the financial institution, remotely at the institution's proprietary core data processing center, at a third-party "service bureau" core processor data center, or at a third party service provider who provides the application processing services to carry out the method of the present invention, and who may also be the core processor for the financial institution.

A novel computer program controlled process has been developed that permits a financial institution, either directly or through a core processor, to determine if an account qualifies for one or more alternate "reward" rates of interest and/or reward payments, or merely a "base" rate of interest and then either pay or accrue the determined amount of interest and/or reward payment to the account. Alternatively, the financial institution can access the computer program application provided through a third party application service provider through suitable communications means to carry out the steps of the process.

In one embodiment, the computer program application resides remotely from the core processor, determines whether the account qualifies for an alternate interest rate and/or reward payment during the qualifying period, determines the amount of interest and/or reward payment to pay the account, communicates the amount to the core processor, and the core processor pays or accrues, as applicable, the interest and/or reward payment amount to the account.

In a variation of the above embodiment, the computer program application resides remotely from the core processor, determines whether the account qualifies for an alternate interest rate and/or reward payment during the qualifying period, determines the amount of interest and/or reward payment to adjust the amount of the interest and/or reward payment previously accrued or paid by the core processor, communicates to the core processor the amount to adjust the interest amount and/or reward payment previously paid or accrued to the account, and then the core processor makes the adjustment.

In another embodiment, the computer program application resides remotely from the core processor, determines the qualification status of a first account, communicates to the core processor what interest rate and/or reward payment to pay the first account and any accounts linked to the first account, and the core processor pays or accrues the interest payment and/or reward payment to one or more of the accounts based upon the interest rate and/or reward payment formula provided by the application.

In another embodiment, the application resides remotely from a core processor which has been previously provided a predetermined number of alternate interest rates and/or reward payment formulas, including the base rate, for designated accounts and the computer program application sends to the core processor a flag or other instruction (e.g., code) that the account qualifies or does not qualify for an alternate interest rate and/or reward payment formula. The flag or other instruction may include an instruction for the core processor indicating what rate or reward payment formula (i.e., "rate" and "reward payment formula" in this context meaning what type of rate or reward payment formula) to pay or accrue. The core processor then pays or accrues the applicable reward, such as calculating an alternative interest rate and/or reward payment based upon whether the account qualifies for the reward or base rate stored. This may include the core processor looking up a rate level and/or reward payment formula (i.e., "level" in this context meaning an absolute value for the rate, such as, for example 6%) that corresponds to the rate (i.e., rate type) indicated by the instruction.

In another embodiment, the computer program application resides at a core processor and the core processor retrieves any necessary information from any third party regarding first account qualification, determines if the account qualifies for a reward such as a reward interest rate and/or reward payment, and pays the reward interest rate and/or reward payment determined based upon the qualification to one or more of the first account and any linked second accounts.

The application has one or more higher-than-market incentive interest rates, or "reward" interest rates and/or reward payment formulas, for qualifying accounts, and a nominal or traditional interest rate, or "base" interest rate, for those accounts that for some reason do not qualify for any rewards rate or rewards payments. The application also permits the financial institution to not pay any interest in those situations permitted by the applicable regulatory agencies. The purpose of the product is to encourage new consumers to join a financial institution to obtain the rewards, which may include higher-than-market interest rate and/or reward payments for funds that traditionally may not see high returns, such as funds held in checking accounts, which typically have a low residence time in the account and are therefore valued less by the financial institution. The product also encourages new and existing customers to provide information to the financial institution. The information provided may permit the financial institution not only to get to know their customers, but the information may also be used to lower the expenses and improve the profitability of managing such accounts. For example, by requiring users that wish to qualify for a higher rewards interest rate and/or reward payments to use certain automated and regularly-scheduled functions such as on-line bill pay, direct deposit, direct debit, electronic statements, and e-mail addresses for sending advertisements and account notifications, the financial institution may be able to significantly lower its overhead costs (e.g., electronic statements versus paper and postage) and increase its income (e.g., charges from increased debit card usage). In essence, the financial institution may use the information provided to increase its own profits by shaving expenses and marketing costs, of which some of the profits are paid as an increased interest rate and/or reward payments for those customers that qualify for rewards on their accounts.

The first account complies with government regulation as set forth recently by the FDIC. In Bulletin No. CHIRO-05-2007, the FDIC warned that "rewards" checking products by some financial institutions may be in violation of Regulation DD, which implements the Truth in Savings Act, because, although a higher-than-market interest rate was awarded, some banking products eliminated interest completely if an account owner or holder did not qualify for the rewards interest rate during a particular qualifying period. The FDIC noted that financial institutions cannot eliminate the payment of interest on anything other than maintaining the minimum balance in an account and cannot require transactions of a certain dollar amount to qualify. The FDIC did note that a financial institution may do an alternate interest deposit account if conditions other than minimum balance and number of transactions are met.

In all embodiments, the first account is a deposit account, such as a checking account at a financial institution that provides the owner of the account a return on a principal deposit amount either at a "base" interest rate or at any combination of a "reward" interest rate and one or more reward payments. Whether the account owner receives interest at a base or a reward interest rate and/or reward payments is dependent on several financial and non-financial factors; however, the account owner will receive a non-zero interest rate on their principal balance regardless of qualification for the higher reward rate and/or reward payments. It should be noted that a zero interest rate return still may occur if the account owner does not meet some other metric not related to the qualifications used to determine the reward interest rate and/or reward payments, such as an established minimum account balance.

According to Federal regulation, a "base" interest rate for an interest-bearing account must be a "bona fide" rate. An embodiment of a method for choosing a "bona fide" rate may include determining the lowest three checking rates in the local market and then setting a base rate at the highest of the three rates.

Although the thought of paying rewards to one or more second accounts linked to a first qualifying account might seem simple on its surface, implementation is not, especially when examining the different data processing functions occurring at and among a financial institution, a financial institution remote data processing center, and/or a third-party core processor. In the context of determining the proper amount of interest and/or payment rewards to credit one or more of the accounts, the financial institution, a financial institution remote data process center, or a third-party core processor may retain information or perform some or all of the steps. In some embodiments, one of the entities may perform all of the necessary steps to determine and pay or accrue the necessary interest and/or reward payments to one or more of the accounts. The means of communications will depend on the relative relationship between the entities, what information they each retain, and what parts of the process they perform for determining and settling the account. In some embodiments, the means for account qualification, determining the amount of interest and/or reward payment to pay, and then paying the amount due are all in the same internal system, often networked together with well-established protocols. In such embodiments, local communications through well-understood network systems such as an intranet or local area network exists. In some embodiments, the means for qualifying an account, determining an amount to be paid, and paying the amount occurs between different computer systems, some of which may be operated by different entities. In such embodiments means for communications may be used that are well understood in the art, including leased telephone lines, microwave transmission, virtual private networks over the Internet and other commonly understood methods.

According to some embodiments, a computer system determines the qualification status of a first account for a reward, the system comprising one or more computer processors that execute application program instructions, memory storage, and ports to receive/transmit digital data. The computer system may also communicate instructions to other computers systems involved with the payment or accrual of interest and/or reward payments to the first account and one or more linked second accounts to adjust, pay, or accrue an amount of or percentage rate of interest and/or reward payment based upon the qualification status determination.

FIG. 1a depicts an embodiment of a computer system 1 that determines the qualification status of an alternate interest bearing account and provides instruction to effect payment or accrual of interest in the account based upon the qualification determination. The computer system 1 includes a memory 2 for storing an application that is executed by a processing unit 4. Memory 2 also stores tables or other data needed by the computer instructions of a novel application program 3. Input/output devices 5 from the computer system 1 transmit and receive information to and from other computer systems, which may be local or remote, needed to obtain all the information necessary to determine the qualification status of an alternate interest bearing account and provide instructions as to the interest rate to be applied to an account in response to the account qualification and other data. (It should be understood that "local or remote" may imply both local and remote.)

FIG. 1b shows an embodiment of the system wherein the computer system 1 including application program 3, resides at a financial institution 10. In this embodiment, computer system 1 is able to perform the determination of qualification for an alternate interest bearing account and prove instruction to effect payment or accrual of interest in the account based upon the qualification determination through several means. The computer system 1 also may retrieve information and provide instructions to a financial institution remote data processing center 20 or a third-party core processor 30 through input/output devices 5 through communications channels 41 via a remote communications network 40. Financial institution remote data processing center 20 and a third-party core processor 30 also have suitable computer systems and communications devices to receive, interpret, and process the instructions received from computer system 1. FIGS. 1c and 1d show embodiments where application program 3 is stored and is executed at a financial institution's remote data processing center 20 or on a suitable computer system, (e.g., a computer system like computer system 1 of FIG. 1b) at a third-party core processor data center 30, respectively. It is understood that one of ordinary skill and creativity in the art will appreciate the variations and modifications not only to computer system 1 but also to applications program 3 that would be required in order to implement the processes at the different locations described.

According to some embodiments, the application program 3 may be licensed as a program product on a computer readable media for use in a computer system that executes the program steps of the application program 3 to perform a method for determining the qualification status of an alternate interest bearing account for an interest rate. The program product may also contain computer-readable instructions executable by the computer system to communicate instructions to other computers systems involved with the payment or accrual of interest to the account to adjust, pay, or accrue an amount of or percentage rate of interest based upon the qualification status determination.

In some embodiments, additional interest rate structures and tiers may be present that are different and separate from the base/reward interest rate structure. For example, balance level break points and above-balance interest rates may demark a deposit fund level above which the main interest rate is changed, whatever it may be. This modification to the interest rate is to either reward additional funds or discourage the accumulation of funds in an account with certain benefits by increasing or decreasing the interest rate for the funds above the additional break level. For example, a checking account may pay a reward interest rate of 6.0% APR (very high) on an account balance between $0.01 and $10,000 held for the qualifying period; however, to discourage people from using their checking accounts as a savings account, the same account may pay an APR of only 0.5% on principal amounts (the above-balance interest rate) above $10,000 (balance level break point) held for the qualifying period. These types of composite or "blended" rate structures can be determined and incorporated into any of the embodiments presented. In some embodiments, the above-balance interest rate and the base interest rate may be different so as to not confuse consumers between the two when disclosure of all the material aspects of the account is given.

Example 1

In the embodiment shown in FIG. 2, a process 100 may be implemented by the system described in FIG. 1b or FIG. 1c where the financial institution uses a core processor to provide most of its data processing needs. Process 100 may be used to determine an amount of interest to credit an alternate interest bearing account ("account") for a given qualification time period, to determine what has already been paid or accrued to the alternate interest bearing account and to create a transaction for communicating an adjustment, either positive or negative, from a financial institution to a remote core processor system to reflect the correct amount of interest to be paid to the alternate interest bearing account by a core processor on behalf of the financial institution. The amount of interest adjusted is based upon whether the account qualifies for a higher interest rate, known as a "reward" interest rate, or a "base" level rate, which is lower than the reward interest rate. In all embodiments, both the base and reward interest rates are positive values, i.e., not "zero."

Process 100 in some embodiments may start with a step 110 to determine the qualification cycle date range. The qualification cycle date range is the period of time used to measure whether the owner of the account has performed the necessary steps to qualify to receive a higher interest rate on the funds. In some embodiments, the information used to determine date range may be acquired locally, e.g., a database of prior periods. In some embodiments, the information used to determine the date range may be acquired remotely, e.g., through communications with a remotely located internal data processing system or the third-party data center, such a core processor, that indicates the new or prior period.

The qualification cycle date range may be determined using several methods, which relate to other date ranges. These other date ranges include a statement cycle and an earnings cycle date period. Specifically, an account balance and interest statement is prepared periodically. The cycle for preparing this statement is referred to herein as the "statement cycle." Likewise, there is a cycle for which earnings on interest are computed. This is referred to herein as the "earnings cycle" or the "earnings cycle date period."

In various embodiments of the invention, the qualification cycle and earnings cycle are offset with respect to the statement cycle. Specifically, the qualification and earnings cycles may be synchronous with respect to one another, but offset with regard to the statement cycle or they may be offset both with respect to the statement cycle and with respect to one another.

To use the qualification cycle as an example, in some embodiments, a time period may be used beginning one day prior to the current statement cycle (i.e., a day before the current account balance and interest statement will be prepared) though one day prior to the close of the current statement cycle. This time period may also be known as a "one-day asynchronous" period with regard to the qualification cycle, since the qualification cycle time period is off-set from the statement cycle time period (closing to closing) by one day, or n days. In some embodiments, a time period for the qualification cycle encompassing the same time period as the prior statement cycle may be used. This time period may also be known as a "one month asynchronous" period, or more generally a "one-cycle asynchronous" period, with regard to the qualification cycle, where the qualification occurs from the actions in the prior statement cycle month but are adjusted in the current statement cycle month. In some embodiments, a "synchronous" method may be used, wherein qualification for the higher interest rate occurs concurrently with the statement cycle.

Likewise, the earnings cycle may be one or n days asynchronous with respect to the statement cycle, one cycle asynchronous, or synchronous. Consequently, the earnings cycle may or may not be synchronous with the qualification cycle. It will be apparent to one of ordinary skill and creativity in the art that other means and techniques may be used to determine a period for judging account qualification for interest rate adjustment.

In process 100, after the qualification cycle date range is determined a step 120 may be made to determine the number of qualifying financial transactions occurring in the potentially qualifying account during the qualification cycle date range. In some embodiments, qualifying financial transactions may be scanned for a given interest bearing account to determine the total number of qualifying financial transactions. Examples of potentially qualifying financial transactions in this and other embodiments may include but not be limited to using an account debit card to perform a POS transaction, using an account access device (such as the computer or the phone), paying bills directly from the alternate interest bearing account, and using the alternate interest bearing account to directly perform auto crediting and debiting of the account. In some embodiments, the qualifying transactions data may be obtained from a core processor or a third party information source before the determination is made locally.

After the number of qualifying transactions has been determined, a step 130 may be made to determine the account qualification data for the account. In some embodiments, account qualification data may be obtained from a core processor or a third-party source. In some embodiments, account qualification data may relate to information about the owner or holder of the account. Examples of such data may include whether the account holder receives account statements electronically, whether an e-mail account for use with financial institution transactions has been provided, or whether the account holder has logged into an internet banking website. In some embodiments, account qualification data may relate to information about the account relating to financial transactions. Examples of such information may include meeting a required minimum amount of debit card transactions, maintaining a minimum account balance (daily and period average), reaching a maximum number of direct deposits, performing a minimum number of bill pay transactions, limiting the account to a maximum number of non-electronic transactions, or maintaining a qualifying loan amount. It will be apparent to one of ordinary skill and creativity in the art that other information may be used to determine what information could be used to provide a metric for account qualification.

In process 100, after the account qualification data has been determined a step 140 may be made to determine the earnings cycle date period by obtaining the earnings cycle date range. The earnings cycle date range is the period of time in which interest has been or will be paid to the account. In some embodiments, the earnings cycle date range is the same as the qualification cycle date range. In some embodiments, the earnings cycle date range may be obtained from a core processor or a third party information source before the determination is made locally.

After the earnings cycle date period has been determined, a step 150 may be made to determine if the core processor has paid or accrued interest on the account for the earnings cycle date range, and, if so, Step 151 is made to determine if the interest has already been paid and a step 152 to determine what that amount is. The core processor interest amount is the amount of interest that the core processor has already paid or accrued to alternative interest rate account during the earnings cycle date period. In some embodiments, the core processor interest amount may be obtained from the core processor or from a third party information source using the communications means previously detailed.

If it is determined that the core processor has already paid or accrued interest on the account during the earnings cycle date range, a step 152 is made to determine the amount of interest for the account already performed by the core processor. In some embodiments, if the core processor has already paid interest to the account based upon an interest rate during the earnings cycle date range, a step 152 is taken where the amount paid by the core processor is determined, and a further step 153 is made to note the total amount already paid for future adjustment to a core interest amount. In some embodiments, if the core processor has only accrued an amount of interest for the account at an interest rate but has not paid it, a step 154 is taken where the amount accrued by the core processor is determined and a further step 155 is made to note the total amount of interest accrued by the core processor to the core interest amount. In some embodiments, if interest has not been either paid or accrued by the core processor (e.g., the core processor does not calculate interest), a step 156 is made wherein a value of "0" is noted to the core interest amount.

After the earnings cycle date period has been determined, a step 160 may be made to retrieve daily balance records for the earnings cycle date period. In some embodiments where the daily balance is used to determine an alternate interest rate separate from the qualifications alternate interest rate, to be paid on the account, daily balance records must exist for the earnings cycle date period in order to calculate both the qualification level interest amount and the balance level interest amount. In some embodiments, the daily balance records may be obtained from a core processor or a third party source before the determination is made locally.

After the daily balance records for the earning cycle date period has been retrieved, a step 170 may be made to retrieve both the "base" and the "reward" interest rates for the alternate interest rate account.

In some embodiments, additional interest rate structures and tiers may be present based beyond the base/reward rate structure. In some embodiments, additional tier levels and interest rates may be determined based upon other criteria, such as the amount of funds in the account. This may be reported to the core processor as balance level break points and above-balance interest rates. In some embodiments the balance level break points and above-balance interest rates may be different between the rewards and base accounts.

In some embodiments where the daily balance is used to determine the interest paid on the account, daily balance records must exist for the earnings cycle date period in order to calculate both the base and rewards level interest amounts. In some embodiments, the daily balance records may be obtained from a core processor or a third party source before the determination is made locally.

After determining the base and the reward interest rates, a step 180 may be made to determine both the base and the reward interest amounts for the earnings cycle period. In a determination to be made further along in the process, accounts that qualify for a rewards interest rate for the qualifying period will receive the rewards interest amount; those accounts that do not will receive the base interest amount. In some embodiments, a daily balance method may be used to determine the base and reward interest amounts for the earning cycle period. In some embodiments, an average daily balance method may be used to determine the base and reward interest amounts for the earning cycle period. In some embodiments, balance level break points and above-balance interest rates may be included in the determination of the base and reward interest amounts for the earning cycle period.

After determining the base and the reward interest amounts, a step 190 may be made to initialize an interest adjustment amount to a value at "0." The interest adjustment amount may be used in some embodiments to adjust the amount of interest accrued or paid to an account handled by the core processor based upon whether the account qualifies for the rewards level of interest payment or not.

After initializing the interest adjustment amount to a "0" value, a step 200 may be made to determine if the account qualifies for receiving the reward level of interest rate during the qualification cycle date range. In some embodiment, the comparative determination is made based upon the data and information acquired during steps 110, 120, and 130. The determination made in step 200 may be used to credit or debit an account based upon whether the account qualifies or does not for a reward interest rate and whether a core processor has either paid or accrued an amount that is reflective of the rate of interest to be paid to the account.

If, in step 200, it is determined that the account qualifies for a reward interest rate, a step 201 may be made to then compare the amount the core processor has previously paid or accrued to the account using the core interest amount versus what the reward interest amount is for the earning cycle period. In some embodiments, if the core processor has paid or accrued to the account at the reward rate of interest, then a step 202 is taken to bypass any adjustments to the amount paid or credited to the account by the core processor. In some embodiments, if the core processor has paid or accrued to the account at an interest rate that is different than the reward interest rate, a step 203 is taken and an interest adjustment amount is determined. In such embodiments, the interest adjustment amount is the difference between the core interest amount and the rewards interest amount.

If, in step 200, it is determined that the account does not qualify for a reward interest rate, a step 204 may be made to then compare the amount the core processor has previously paid or accrued to the account using the core interest amount versus what the reward interest amount is for the earning cycle period. In some embodiments, if the core processor has paid or accrued to the account at the base rate of interest, then a step 205 is taken to bypass any adjustments to the amount paid or credited to the account by the core processor. In some embodiments, if the core processor has paid or accrued to the account at an interest rate that is different than the reward interest rate, a step 206 is taken and an interest adjustment amount is determined. In such embodiments, the interest adjustment amount is the difference between the core interest amount and the base interest amount.

After it has been determined if there is an interest payment or accrual adjustment to the amount of interest paid or accrued by the core processor and what that amount is, a step 210 may be made wherein the interest adjustment amount is converted into a transaction for transmission to the core processor for interest amount adjustment to the account. In some embodiments, if the interest adjustment amount is greater than 0, indicating that an amount of interest to be credited to the account exists, then step 211 is taken and a credit transaction in the amount of the interest adjustment amount is created. In some embodiments, if the core processor has paid interest to the account (as determined in step 152), then step 211 creates a transaction that instructs the core processor to pay an additional interest amount to the account. In some other embodiments, if the core processor has only accrued interest to the account (as determined in step 154), then in step 211 a transaction is created that instructs the core processor to accrue additional interest on the account for future payment. In some embodiments, if the interest adjustment amount is less than 0, indicating that an amount of interest is to be debited from the account, then step 213 is taken and a debit transaction in the amount of the interest adjustment amount is created. In some embodiments, if the core processor has paid interest to the account (as determined in step 152), then step 213 creates a transaction that instructs the core processor to reverse a portion of the interest payment from the account. In some other embodiments, if the core processor has only accrued interest to the account (as determined in step 154), then in step 213 a transaction is created that instructs the core processor to deduct some accrued interest on the account. In some other embodiments, if the amount of initial adjustment amount is 0, then step 214 is made and no core processor uploading transaction is created.

At the completion of process 100 at step 215, a credit upload, a debit upload, or no upload transaction exists to adjust the interest accrued or paid to an alternate interest bearing account at a core processor to properly reflect the amount of interest to be paid to the account based upon its qualification (or lack thereof) for a higher interest rate. The process 100 may be repeated for the same or another account so as to aggregate a series of debit and credit upload transactions to be transmitted by conventional means to a core processor for batch account interest adjustment.

Example 2

In another embodiment as shown in FIG. 3, a process 300 wherein a financial institution determines if an account qualifies for a reward level of interest rate or merely for the base level of interest rate and instructs the core processor to pay an interest rate based upon the determination. The issues and variations of the embodiment of process 300 for steps 310, 320, and 330, are similar to steps 110, 120, and 130, respectively, as described in process 100.

After the account qualification data has been determined in step 330, a step 340 may be made to determine if the account qualifies for receiving the reward level of interest rate during the qualification cycle date range. In some embodiments, the comparative determination is made based upon the data and information acquired during steps 310, 320, and 330. The determination made in step 340 may be used to credit an account based upon whether the account qualifies or does not qualify for a reward interest rate.

If, in step 340, it is determined that the account qualifies for a reward interest rate, a step 341 may be made to determine if the "pay rewards interest" accounts are to be included in a batch file upload to the core processor. This may be the case when the core processor does not automatically calculate the accrued or paid interest at the rewards interest rate. If the "pay rewards interest" accounts are not to be included in the upload to the core processor, then no record is recorded. If the "pay rewards interest" account information is to be included in an upload to the core processor, then a step 342 is made and the account information is written to an account record for the core processor upload file. The account record may contain the necessary information to instruct the core processor to pay or accrue interest for the account on a rewards level interest basis. For example, the information may include a binary indication as to whether to pay the rewards level interest, which rewards interest rate to use, or other information such as balance level break points and above-balance interest rate adjustments.

If, in step 340, it is determined that the account qualifies for a base interest rate, a step 343 may be made to determine if the "pay base interest" accounts are to be included in a batch file upload to the core processor. This may be the case when the core processor does not automatically calculate the accrued or paid interest at the base interest rate. If the "pay base interest" accounts are not to be included in the upload to the core processor, then no record is recorded. If the "pay base interest" account information is to be included in an upload to the core processor, then a step 343 is made and the account information is written to an account record for the core processor upload file. The account record may contain the necessary information to instruct the core processor to pay or accrue interest for the account on a base level interest basis.

At the completion of process 300 at step 350, a batch upload of account information is sent to the core processor, wherein the core processor pays or accrues interest for the accounts given the interest information for the earnings period. Process 300 may be repeated for the same or another account so as to aggregate a series of account records are recorded for upload to a core processor and transmitted by conventional means to a core processor for batch account interest adjustment.

Example 3

In another embodiment as shown in FIG. 4, a process 400 wherein a core processor performs the account qualification and pays applicable interest to an account after obtaining information from the financial institution or other third-party providers. Process 400 may be in many aspects similar to process 100; however, a significant difference may be that the core processor, an entity outside the financial institution, performs all the determination functions instead of the financial institution.

The issues and variations of the embodiment of process 400 for steps 410, 420, 430, and 440 are similar to steps 110, 120, 130, and 140, respectively, as described in process 100, except that the core processor may obtain information from the financial institution in process 300 whereas the financial institution obtained information from the core processor in process 100. The issues and variations of the embodiment of process 400 for steps 450 and 460 are similar to steps 160 and 170, respectively, as described in process 100, except again the core processor may obtain information from the financial institution in process 300 whereas the financial institution obtained information from the core processor in process 100.

After obtaining base and rewards interest rate information from the financial institution, a step 470 may be performed wherein the base interest amount for the earnings cycle period is determined for an account. In some embodiments, a daily balance method may be used to determine the base interest amount for the earning cycle period. In some embodiments, an average daily balance method may be used to determine the base interest amount for the earning cycle period. In some embodiments, balance level break points and above-balance interest rates may be included in the determination of the base interest amounts for the earning cycle period.

After determining the base interest amount for the earnings cycle period, a step 480 may be performed wherein the rewards interest amount for the earnings cycle period is determined for the account. In some embodiments, a daily balance method may be used to determine the rewards interest amounts for the earning cycle period. In some embodiments, an average daily balance method may be used to determine the reward interest amount for the earning cycle period. In some embodiments, balance level break points and above-balance interest rates may be included in the determination of the reward interest amounts for the earning cycle period. In some embodiments, step 470 and 480 are performed simultaneously.

In process 400, after determining the account qualification in step 480, a step 490 may be made to determine if the account qualifies for receiving the reward level of interest rate during the qualification cycle date range. In some embodiments, the comparative determination is made based upon the data and information acquired during steps 410, 420, and 430. The determination made in step 480 may be used to credit an account based upon whether the account qualifies or does not qualify for a reward interest rate.

The calculations made in steps 470 and 480 may be used to credit the account based upon whether the account qualifies or does not qualify for a reward interest rate. If, in step 490, it is determined that the account qualifies for a reward interest rate, a step 491 may be made to post the rewards interest amount, as calculated in step 480 to the account. Since the core processor directly makes the qualification determination instead of the financial institution, the core processor can automatically credit the account with the reward interest in step 500 upon finding that the account has qualified. If, in step 490, it is determined that the account does not qualify for the rewards interest rate, a step 492 may be made to post the base interest amount, as calculated in step 470, to the account and credit given to the account by step 500.

FIG. 5*a* depicts an embodiment of a computer system 600 that determines the qualification status of a first account and provides instruction to reward an account by payment or accrual of interest and/or reward payments in the first account and/or linked second accounts based upon the qualification determination. The computer system 600 includes a memory 622 for storing an application that is executed by a processing unit 612. Memory 622 also stores tables or other data 614 needed by the computer instructions of a novel application program 612. Input/output devices 618 from the computer system 600 transmit and receive information to and from other computer systems, which may be local or remote, needed to obtain all the information necessary to determine the qualification status of the first account and provide instructions as to the interest rate and/or rewards payment formula to be applied to the first account and/or any linked second accounts in response to the account qualification and other data. (It should be understood that "local or remote" may imply both local and remote.)

FIG. 5b shows an embodiment of the system wherein the computer system 600, including application program 612, resides at a financial institution 610. In this embodiment, computer system 600 is able to perform the determination of qualification for a first account and provide instruction to effect payment or accrual of interest and/or reward payments in the first account and/or any linked second accounts based upon the qualification determination through several means. The computer system 600 also may retrieve information and provide instructions to a financial institution remote data processing center 620 or a third-party core processor 630 through input/output devices 5 through communications channels 641 via a remote communications network 640. Financial institution remote data processing center 620 and a third-party core processor 630 also have suitable computer systems and communications devices to receive, interpret, and process the instructions received from computer system 600. FIGS. 5c and 5d show embodiments where application program 612 is stored and is executed at a financial institution's remote data processing center 620 or on a suitable computer system, (e.g., a computer system like computer system 600 of FIG. 5b) at a third-party core processor data center 630, respectively. It is understood that one of ordinary skill and creativity in the art will appreciate the variations and modifications not only to computer system 600 but also to application program 612 that would be required in order to implement the processes at the different locations described.

According to some embodiments, the application program 612 may be licensed as a program product on a computer readable media for use in a computer system that executes the program steps of the application program 612 to perform a method for determining the qualification status of a first account for an interest rate and/or reward payment. The program product may also contain computer-readable instructions executable by the computer system to communicate instructions to other computer systems involved with the payment or accrual of interest and/or reward payments to the first account and/or linked second accounts to adjust, pay, or accrue a reward such as an amount of or percentage rate of interest and/or reward payment based upon the qualification status determination.

In some embodiments, additional interest rate and/or reward payment formula structures and tiers may be present that are different and separate from the base/reward interest rate and reward payment formula structure. For example, balance level break points and above-balance interest rates and/or reward formulas may demark a deposit fund level above which the main interest rate and/or reward payment formula is changed, whatever it may be. This modification to the interest rate and/or reward payment formula is to either reward additional funds or discourage the accumulation of funds in an account with certain benefits by increasing or decreasing the interest rate and/or reward payment for the funds above the additional break level. For example, a checking account may pay a reward interest rate of 6.0% APR (very high) on an account balance between $0.01 and $10,000 held for the qualifying period; however, to discourage people from using their checking accounts as a savings account, the same account may pay an APR of only 0.5% on principal amounts (the above-balance interest rate) above $10,000 (balance level break point) held for the qualifying period. These types of composite or "blended" rate and/or reward payment structures can be determined and incorporated into any of the embodiments presented. In some embodiments, the above-balance interest rate and/or reward payment formula and the base interest rate and/or reward payment formula may be different so as to not confuse consumers between them when disclosure of all the material aspects of the first account is given.

Example 4

In the embodiment shown in FIG. 6, a process 700 may be implemented by the system described in FIG. 5b, 5c, or 5d where the financial institution uses a core processor to provide most of its data processing needs. Process 700 may be used to determine an amount of reward payment to credit one or more linked second accounts based on qualifying activity in a first account for a given qualification time period, to determine what has already been paid or accrued to the linked second accounts and to create a transaction for communicating an adjustment, either positive or negative, from a financial institution to a remote core processor system to reflect the correct amount of reward payment to be paid to one or more of the linked second accounts by a core processor on behalf of the financial institution. The amount of reward payment adjusted is based upon whether the account qualifies for a reward payment and/or reward interest rate, or a "base" level rate, which is lower than the reward interest rate. In all embodiments, both the base and reward interest rates are positive values, i.e., not "zero."

Process 700 in some embodiments may start with a step 712 to determine if the first account met the qualification criteria to earn a reward during the qualification cycle date range. The qualification criteria can include qualifying financial transactions and account qualification data. The qualification cycle date range is the period of time used to measure whether the owner of the account has performed the necessary steps to qualify to receive a reward on the funds in the first account. In some embodiments, the information used to determine date range may be acquired locally, e.g., a database of prior periods. In some embodiments, the information used to determine the date range may be acquired remotely, e.g., through communications with a remotely located internal data processing system or the third-party data center, such a core processor, that indicates the new or prior period.

The qualification cycle date range may be determined using several methods, which relate to other date ranges. These other date ranges include a statement cycle and an earnings cycle date period. Specifically, an account balance, reward payments, and interest statement is prepared periodically. The cycle for preparing this statement is referred to herein as the "statement cycle." Likewise, there is a cycle for which earnings on interest are computed. This is referred to herein as the "earnings cycle" or the "earnings cycle date period."

In various embodiments of the invention, the qualification cycle and earnings cycle are offset with respect to the statement cycle. Specifically, the qualification and earnings cycles may be synchronous with respect to one another, but offset with regard to the statement cycle or they may be offset both with respect to the statement cycle and with respect to one another.

To use the qualification cycle as an example, in some embodiments, a time period may be used beginning one day prior to the current statement cycle (i.e., a day before the current account balance and interest statement will be prepared) though one day prior to the close of the current statement cycle. This time period may also be known as a "one-day asynchronous" period with regard to the qualification cycle, since the qualification cycle time period is off-set from the statement cycle time period (closing to closing) by one day, or n days. In some embodiments, a time period for the qualification cycle encompassing the same time period as the prior statement cycle may be used. This time period may also be known as a "one month asynchronous" period, or more generally a "one-cycle asynchronous" period, with regard to the qualification cycle, where the qualification occurs from the actions in the prior statement cycle month but are adjusted in the current statement cycle month. In some embodiments, a "synchronous" method may be used, wherein qualification for the higher interest rate occurs concurrently with the statement cycle.

Likewise, the earnings cycle may be one or n days asynchronous with respect to the statement cycle, one cycle asynchronous, or synchronous. Consequently, the earnings cycle may or may not be synchronous with the qualification cycle. It will be apparent to one of ordinary skill and creativity in the art that other means and techniques may be used to determine a period for judging account qualification for interest rate adjustment and/or reward payments.

In some embodiments, qualifying financial transactions may be scanned for the first account to determine the total number of qualifying financial transactions. Examples of potentially qualifying financial transactions in this and other embodiments may include but not be limited to using an account debit card to perform a POS transaction, using an account access device (such as the computer or the phone), paying bills directly from the first account, and using the first account to directly perform automatic crediting and debiting of the account. In some embodiments, the qualifying transactions data may be obtained from a core processor or a third party information source before the determination is made locally.

In some embodiments, account qualification data may relate to information about the owner or holder of the first account. Examples of such data may include whether the account holder receives account statements electronically, whether an e-mail account for use with financial institution transactions has been provided, or whether the account holder has logged into an internet banking website. In some embodiments, account qualification data may relate to information about the account relating to financial transactions. Examples of such information may include meeting a required minimum amount of debit card transactions, maintaining a minimum account balance (daily and period average), reaching a maximum number of direct deposits, performing a minimum number of bill pay transactions, limiting the first account to a maximum number of non-electronic transactions, or maintaining a qualifying loan amount. In some embodiments, account qualification data may be obtained from a core processor or a third-party source. It will be apparent to one of ordinary skill and creativity in the art that other information may be used to determine what information could be used to provide a metric for account qualification.

In process 700, after the qualifying status of the first account has been determined in step 714, and the first account is found to be qualified, a step 716 may be made to identify any second accounts that are linked to the first account and are therefore eligible for rewards.

After any linked second accounts have been identified, a step 718 may be made to calculate the reward payments owed based on qualifying financial transactions and/or account qualification data for the first account and any linked second accounts. In some embodiments where the daily balance is used to determine the reward paid on the account, daily balance records must exist for the earnings cycle date period in order to calculate both the base and rewards level interest and/or reward payment amounts. In some embodiments, the daily balance records may be obtained from a core processor or a third party source before the determination is made locally. The earnings cycle date period is determined by obtaining the earnings cycle date range. The earnings cycle date range is the period of time in which interest has been or will be paid to the account. In some embodiments, the earnings cycle date range is the same as the qualification cycle date range. In some embodiments, the earnings cycle date range may be obtained from a core processor or a third party information source before the determination is made locally.

After the reward payments have been calculated, a step 720 may be made to determine how the reward payments are to be credited to the first account and any linked second accounts.

If the financial institution or the account owner has determined that all rewards are to be directly deposited into one or more of the linked second accounts, then a step 722 may be made to directly deposit all of the reward payments into the specified linked second accounts.

In process 700, in the event the first account did not meet the qualification criteria, step 726 tags the account as ineligible to earn rewards, and a step 728 may be made to calculate interest payments to the first and any linked second accounts at the base interest rate.

After determining which accounts are to receive deposits in what amounts in either step 722 or step 728, a step 724 may be made wherein each deposit amount is converted into a transaction for transmission to the core processor for balance adjustments to the accounts. In some embodiments, a credit transaction in the amount of the deposit amount is created.

At the completion of process 100 at step 734, a credit upload transaction exists to adjust the interest accrued or paid and/or the reward payment paid to the first account and any linked second accounts at a core processor to properly reflect the amount of interest and/or payment to be paid to the accounts based upon the first account's qualification (or lack thereof) for a reward payment or higher interest rate. The process 100 may be repeated for the same or another account so as to aggregate a series of credit upload transactions to be transmitted by conventional means to a core processor for batch account balance adjustment at step 730. Likewise, a customer communication and notification to the financial institution of the credit upload transactions are sent at step 732.

Example 5

Figure 7A:
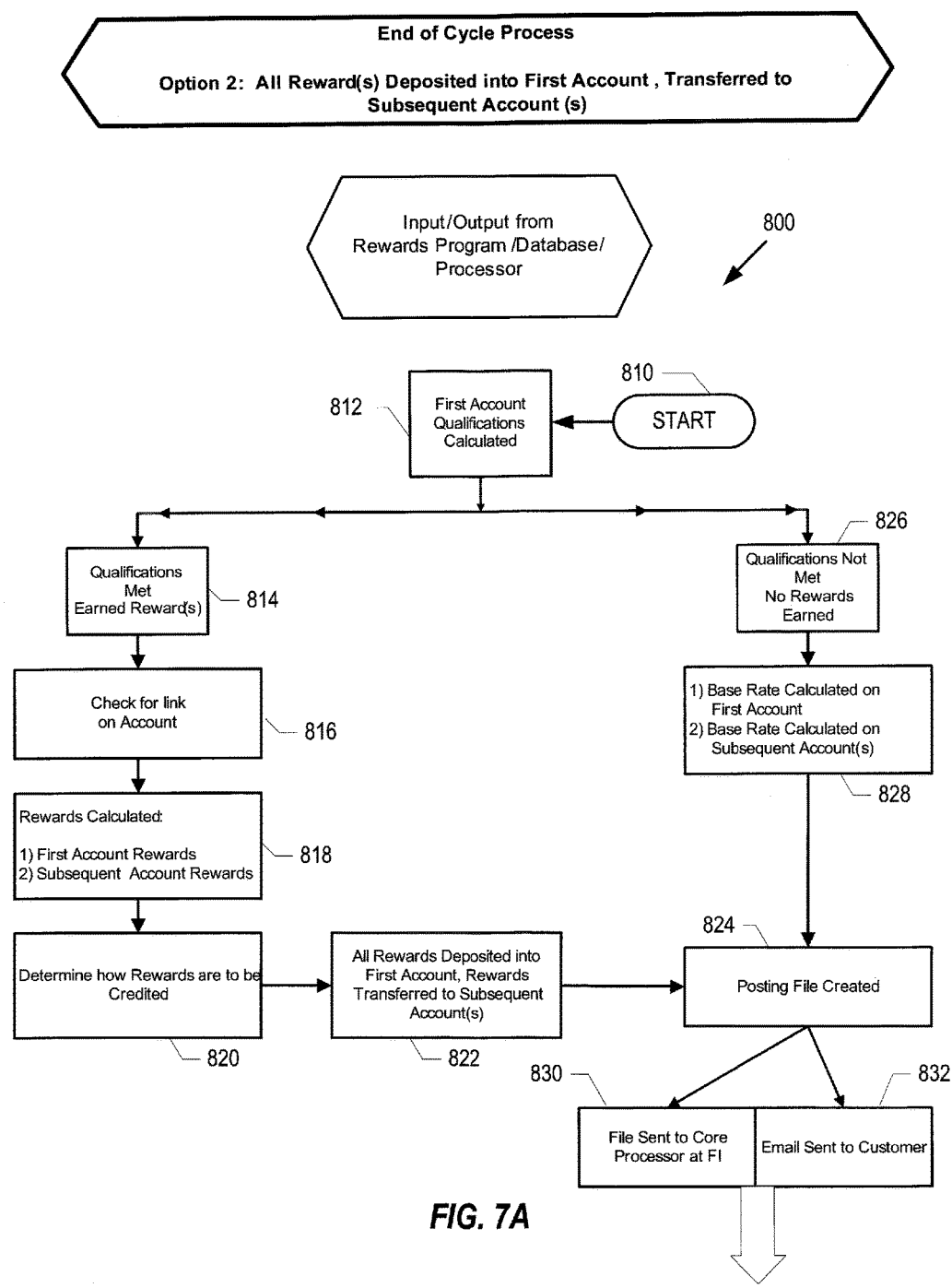
Figure 7B:
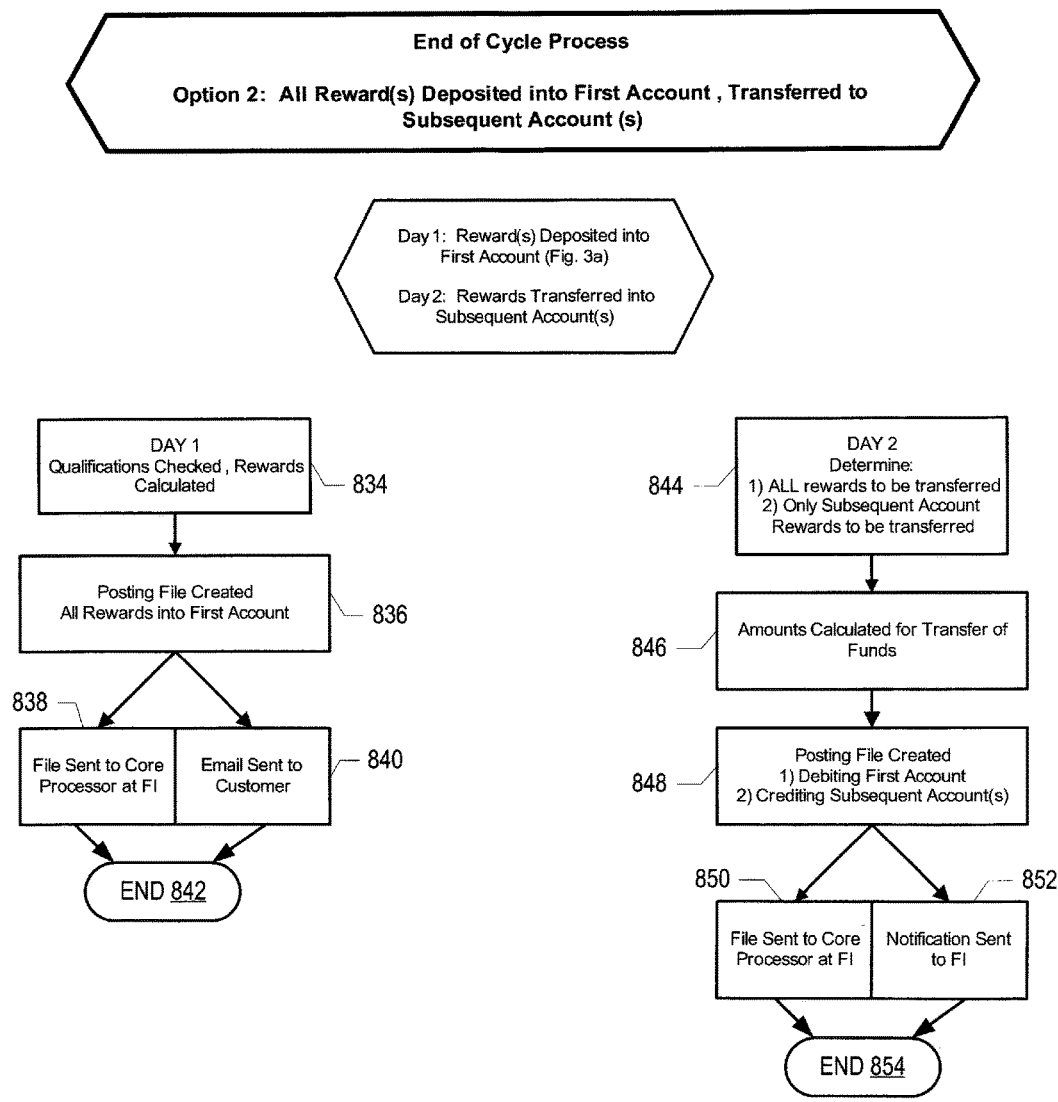

In another embodiment as shown in FIGS. 7*a-b*, a process 800 wherein a financial institution determines if a first account qualifies for a reward, such as a higher interest rate level and/or a reward payment or merely for the base level of interest rate and instructs the core processor to pay an interest rate and/or a reward payment based upon the determination. The issues and variations of the embodiment of process 800 for steps 810, 812, 814, 816, 818, 824, 826, 828, 830, and 832 are similar to steps 710, 712, 714, 716, 718, 724, 726, 728, 730, and 732, respectively, as described in process 700.

After the reward payments have been calculated in step 818, a step 820 may be made to determine how the reward payments are to be credited to the first account and any linked second accounts.

If the financial institution or the account owner has determined that all reward payments are to be initially deposited into the first account on a first day and to subsequently transfer a portion or all of the reward payments to one or more of the linked second accounts, then a step 822 may be made to deposit all of the reward payments into the first account on the first day and to subsequently transfer a portion or all of the reward payments to the specified linked second accounts.

FIG. 7b shows the steps of process 800 as they are performed on two separate days. On the first day, in step 834, the first account's qualifications are checked, and, if the first account is eligible, the reward payments are calculated for the first account and any linked second accounts (steps 812-818 of FIG. 7a). In step 836, a posting file is created that credits all reward payments to the first account. Steps 838 and 840 are identical to steps 830 and 832 of FIG. 7a.

On the second day, a step 844 may be made to determine if the financial institution or the account owner has determined that all reward payments are to be transferred to one or more linked second accounts or if only reward payments earned by linked second accounts are to be transferred.

After determining whether all funds are to be transferred or only those earned by linked second accounts, a step 846 may be made to calculate which accounts are to receive which reward payments.

Subsequently, a step 848 may be made to create a posting file. The posting file contains an entry debiting the first account and crediting one or more linked second accounts for each of the transfers to be made. Steps 850 and 852 are identical to steps 830 and 832 of FIG. 7a.

Example 6

In another embodiment as shown in FIG. 8, a process 900 wherein a financial institution determines if a first account qualifies for a reward, such as a higher rate of interest rate and/or a reward payment or merely for the base level of interest rate and instructs the core processor to pay an interest rate and/or a reward based upon the determination. The issues and variations of the embodiment of process 900 for steps 910, 912, 914, 916, 918, 924, 926, 928, 930, and 932 are similar to steps 710, 712, 714, 716, 718, 724, 726, 728, 730, and 732, respectively, as described in process 700.

After the reward payments have been calculated in step 918, a step 920 may be made to determine how the reward payments are to be credited to the first account and any linked second accounts.

If the financial institution or the account owner has determined that each reward payment is to be deposited directly into the account in which the reward payment was earned, then a step 922 may be made to deposit each of the reward payments into the account in which reward payment was earned.

Example 7

In another embodiment as shown in FIG. 9, a process 1000 wherein a financial institution determines if a first account qualifies for a reward level of interest rate and/or a reward payment or merely for the base level of interest rate and instructs the core processor to pay an interest rate and/or a reward payment based upon the determination. The issues and variations of the embodiment of process 1000 for steps 1010, 1012, 1014, 1016, 1018, 1024, 1026, 1028, 1030, and 1032 are similar to steps 710, 712, 714, 716, 718, 724, 726, 728, 730, and 732, respectively, as described in process 700.

After the reward payments have been calculated in step 1018, a step 1020 may be made to determine how the reward payments are to be credited to the first account and any linked second accounts.

If the financial institution or the account owner has determined that some of the reward payments earned by the first account are to be deposited into the first account and some of the reward payments are to be deposited into one or more linked second accounts, then a step 1022 may be made to deposit some of the reward payments into the first account and some of the reward payments into one or more of the linked second accounts.

The same technique can be used to give a customer the option to set at the financial institution level to have deposits, such as direct deposits through an EFT network, automatically split between accounts. For example, the process 1000 can be applied to a payroll check deposited via ACH at the financial institution to split the deposit according to a pre-determined percent or set amount between the customer's linked checking and savings accounts.

It should be appreciated by those skilled in the art, that there are numerous embodiments of the present invention. In the embodiments, systems, program products, and methods for providing a plurality of alternate interest rates and/or reward payments to a first account and one or more linked second accounts of a financial institution's account holders are disclosed. Briefly, the account holders of one or more linked second accounts at a financial institution may obtain at least one alternate interest rate and/or a reward payment, or a "base" rate of interest, based on qualifying activity in a first account. If an account holder does not qualify for a higher alternate interest rate and/or reward payment, the account holder is still provided a base interest rate of earnings on the account principal provided the account meets the balance criteria for obtaining the base rate. Application software for determining if an account holder qualifies for an alternate interest rate and/or reward payment and determining which alternate interest rate and/or reward payment is to be paid on an account during a period and computing the interest and/or reward payment to be paid to the account holder on both the first account and any linked second accounts may be located locally at the financial institution, remotely at the institution's proprietary data processing center, or at a third-party core processor data center.

System

According to some embodiments, the present invention provides for a computer-based system that determines the qualification status of a first account for one out of a predetermined plurality of interest rates and/or reward payments. The computer system may also communicate instructions to other computers systems involved with the payment or accrual of interest and/or reward payments to the first account and one or more linked second accounts to adjust, pay, or accrue an amount of or percentage rate of interest and/or reward payments based upon the qualification status determination.

According to some embodiments, the present invention provides for a computer system that determines the qualification status of a first account for one of a plurality of interest rates and/or reward payments and communicates to a core processor instructions to pay or credit an interest adjustment and/or reward payment amount reflective of the determined interest rate and/or reward payment formula. The system may include instructions and means for communicating with an internal data processing system to retrieve and communicate information necessary for making determinations. The internal data processing system may either be proximately located or remotely located from the computer system. The system may include instructions and means for communicating with a core processor to retrieve and communicate information necessary for making determinations.

The system may include instructions for retrieving information for and determining a qualification period based upon a qualification date range. The system may include instructions for retrieving information for and determining a total number of qualifying transactions for the qualification period. The system may include instructions for retrieving information for account level qualification data. The system may include instructions for retrieving information for and determining an earnings cycle period from an earnings cycle date range. The system may include instructions for retrieving information for and determining if an interest amount and/or reward payment has been paid or accrued during the earnings cycle period by the core processor. The system may include instructions for retrieving information for retrieving daily balance records for the earnings cycle period. The system may include instructions for retrieving information for the base and the reward interest rates and reward payments for the first account and any linked second accounts. The base and reward interest rates and reward payment formulas may or may not be tiered based upon account balances. The system may include instructions for determining if the account qualifies for rewards level interest and/or reward payments, or a base level of interest. The system may include instructions for determining the amount to adjust the interest and/or reward payment amount paid or accrued, wherein the system further executes program instructions to create an upload transaction based upon the amount to adjust the interest and/or reward payment amount paid or accrued. The system may include instructions for uploading the interest adjustment and/or reward payment amount for the account from the financial institution to the core processor, wherein the core processor further executes program instructions to do so.

According to some embodiments, the present invention provides for a computer system that determines the qualification status of a first account for an interest rate and/or reward payment and communicates to a core processor instructions to use an interest rate and/or reward payment formula, wherein the computer system includes at least a computer processor that executes program instructions and receives a digital data set. Similar to other embodiments, the system may include instructions and means for communicating with a core processor. The system may include instructions for retrieving information for and determining a qualification period based upon a qualification date range. The system may include instructions for retrieving information for and determining a total number of qualifying transactions for the qualification period. The system may include instructions for retrieving information for account level qualification data. The system may include instructions for determining if the account qualifies for rewards level interest and/or a reward payment, or a base level of interest. The system may include instructions for determining if data or instructions for the core processor are to be created and uploaded to a file based on whether the account is either a "pay rewards interest and/or pay a reward payment" or "pay base interest" account from the prior account qualification determination, wherein the system further executes program instructions to create a file comprised of data and instructions for the core processor reflecting this determination for uploading, wherein the system further executes program instructions to do so.

According to some embodiments, the present invention provides for a system wherein the core processor includes a computer system that determines the qualification status of a first account for an interest rate and/or reward payment or reward interest rate, calculates the amount of interest and/or reward to be paid to the first account and/or any linked second accounts, and pays an appropriate amount of interest and/or reward to the first account and/or any linked second accounts, including one or more computer processors that execute program instructions and receive a digital data set. The system may include instructions and means for communicating with either an in house core processor or a financial institution to retrieve and communicate information necessary for making determinations. The core processor may either be proximately located or remotely located from the computer system. The means for communicating with a financial institution or financial data processing data center may include locally proximate computer network structures such as data busses, intranets, and local area computer networks as well as remote computer network architectures such as wide area networks, leased telephone lines, and the Internet, the means being well understood to one of ordinary skill in the art of computer network communications. The system may include instructions for retrieving information for and determining a qualification period based upon a qualification date range. The system may include instructions for retrieving information for and determining a total number of qualifying transactions for the qualification period. The system may include instructions for retrieving information for account level qualification data. The system may include instructions for retrieving information for and determining an earnings cycle period from an earnings cycle date range. The system may include instructions for retrieving daily balance records for the earnings cycle period. The system may include instructions for retrieving information for the base and the reward interest rates for the alternate interest rate account. The system may include instructions for determining the base interest amount during the earnings cycle. The system may include instructions for determining the rewards interest amount during the earnings cycle. The system may also include instructions for determining a reward payment amount during the earnings cycle. The system may also include instructions for determining which reward payments are to be credited to which account. The system may include instructions for determining if the account qualifies for rewards level interest and/or reward payment, or a base level of interest, wherein the core processor further executes program instructions to pay the determined amount of interest and/or reward based upon the account qualification determination.

Methods

According to some embodiments, the present invention provides a method for a financial institution to determine the qualification status of a first account, communication to a core processor (and potentially other as of information) to instruct it to pay or credit an appropriate amount of interest and/or reward payment to the account, and the core processor doing so, including determining a qualification period based upon a qualification date range. All information may be retrieved from the core processor using communications means. The qualification period may be determined using an n-day asynchronous method, a one-month asynchronous method, or a synchronous method. The method may include determining a total number of qualifying transactions for the qualification period. Qualifying transactions may include, but are not limited to, a specified minimum number of debit card transactions, a specified minimum number of ATM withdrawals, a specified number of bill pay transactions, a specified number of direct deposits, and a specified number of direct debits. The method may include retrieving account level qualification data. Account level qualification data may include but are not limited to such information as electronic receipt of account statements, an e-mail address, previous logging on to an internet website, meeting a minimum number of debit card transactions, maintaining a minimum account balance, meeting a certain number of direct deposits, performing a number of bill pay transactions, limiting the number of non-electronic transactions to the account, or maintaining a qualifying loan amount. The method may include determining an earnings cycle period from a retrieved earnings cycle date range. The earnings cycle period may not be the same period as the qualification date period. The method may include determining if an interest amount and/or reward payment has been paid or accrued during the earnings cycle period by the internal data processing system or a third-party data center. The method may include retrieving daily balance records for the earnings cycle period. The method may include retrieving the base and the reward interest rates and reward payment formulas for the first account and any linked second accounts. The base interest rate may be determined using a method comprising determining the lowest three checking rates in the local market and then setting a base rate at the highest of the three rates. Balance level break points and above-balance interest rates may be included in either or both the base and rewards interest rate and/or reward payment formula determination. The method may include determining if the first account qualifies for rewards level interest and/or reward payments. The method may include determining if the first account does not qualify for rewards level interest and/or reward payments. An interest adjustment amount may be determined as to be the difference between the base or reward interest and the paid or accrued interest amount. The method may include creating an interest adjustment and/or reward payment transaction. If the interest adjustment amount is a positive amount or a reward payment is to be made, a credit upload transaction is created. If the interest adjustment amount is a negative amount, a debit upload transaction is created. The system may include uploading the interest adjustment amount and/or reward payment amount for the account from the financial institution to the core processor using a communications means. The system may alternately include uploading the instructions to the core processor for which the base rate or the reward rate and/or reward payment should be paid to the account holder using a communication means. The system may include the core processor accruing interest to the first account and any linked second accounts. The system may include the core processor paying interest and/or reward payments to the first account and any linked second accounts.

According to some embodiments, the present invention provides a method for a financial institution to determine the qualification status of a first account, to communicate to either its own core processor to use a provided interest rate and/or reward payment formula to determine the payable interest and/or reward to the first account and any linked second accounts, and then the core processor to pay the interest and/or reward payments to the first account and/or any linked second accounts, including determining a qualification period based upon a qualification date range. All information may be retrieved from the core processor using a communications means. The method may include determining a total number of qualifying transactions for the qualification period. The method may include retrieving account level qualification data. The method may include determining if the first account qualifies for rewards level interest and/or reward payments. The method may include determining if the first account does not qualify for rewards level interest. The method may include creating an account record instructing the core processor to pay base interest or pay reward interest and/or reward payments based upon whether the first account qualifies for a rewards interest rate and/or reward payments, or a base interest rate. The reward interest and/or reward payment records may not be uploaded to the core processor. The method may include uploading account records from the financial institution to the internal data processing system or the third-party data center using a communications means. The method may include the core processor determining the amount of interest and/or reward payment to pay from the uploaded account records and paying the proper amount of interest and/or reward payment into the first account and/or any linked second accounts.

According to some embodiments, the present invention provides method for a core processor to determine the qualification status of a first account, calculate the amount of interest and/or reward payments to be paid to the first account and any linked second accounts, and to pay an appropriate amount of interest and/or reward payments to the first account and/or any linked second accounts, including determining a qualification period based upon a qualification date range. All information may be retrieved by the core processor using a communications means. The method may include determining a total number of qualifying transactions for the qualification period. The method may include retrieving account level qualification data. The method may include determining an earnings cycle period from a retrieved earnings cycle date range. The method may include retrieving daily balance records for the earnings cycle period. The method may include retrieving the base and the reward interest rates for the alternate interest rate account. The method may include determining both base interest and reward interest amounts for the earnings cycle period. The method may include determining if the first account qualifies for a reward interest rate, in which the method includes posting the reward interest and/or reward payment amounts to the first account and/or any linked second accounts. The method may include determining if the first account does not qualify for a reward interest rate and/or reward payment, in which the method includes posting the base reward interest amount to the first account and any linked second accounts.

Program Product

According to some embodiments, the present invention provides for a program product for use in a computer system that executes the program steps stored in memory to perform a method as previously described.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A computer-implemented method for applying rewards to accounts at a financial institution, the method comprising:
   a) providing a reward plan, which includes an interest rate plan for applying interest rates to depository accounts at the financial institution, the interest rate plan comprising:
      (i) a plurality of tiers for a first account, wherein each of the tiers correspond to an account balance range,
      (ii) a base rate for each tier in the plurality of tiers for the first account,
      (iii) one or more rate levels for the first account, wherein
         (A) each of the first account rate levels has qualification criteria associated therewith,
         (B) the qualification criteria for each of the first account rate levels comprises at least one account level qualification criteria and at least one account transaction qualification criteria,
         (C) for each first account rate level, each tier in the plurality of tiers has an alternate interest rate, and
         (D) for each first account rate level, at least a first tier in the plurality of tiers has a first alternate interest rate that is a higher-than-market interest rate;
      (iv) a second account linked to the first account, the second account having at least one base rate and at least one rate level with a reward alternate interest rate;
   b) designating the first account to receive a reward based upon the reward plan;
   c) determining if the second account is linked to the designated first account;
   d) providing an application program for implementing the method in communication with a core processor system for the financial institution over a communications network;
   e) associating the core processor system with a rate type from a plurality of rate types that is suitable for communicating the one or more rate levels to the core processor system;
   f) providing at least one memory accessible by the application program that includes:
      (i) the reward plan; and
      (ii) an accounting period associated with the reward plan;
   g) accessing, via the application program, the accounting period associated with said reward plan;
   h) accessing, via the application program, the reward plan including (i) the qualification criteria for the one or more first account rate levels (ii) the at least one rate level for the second account;
   i) accessing, via the application program, account criteria data for the first account during the accounting period;
   j) determining whether the account criteria data for the designated first account qualifies the first account for a reward for the accounting period;
   k) determining, via the application program, whether the account criteria data for the designated first account meets for the accounting period (i) at least one account level qualification criteria for one of the one or more first account rate levels and (ii) at least one account transaction qualification criteria for one of the one or more rate levels;
   l) upon determining that the designated first account meets the qualification criteria for one of the one or more first account rate levels, instructing the core processor system to apply the reward alternate interest rate to the second account for the accounting period, wherein the instructing includes converting the determined rate level of the second account into a code for transmission to the core processor using the associated rate type, generating an instruction that includes the code, and sending the instruction to the core processor system to adjust the interest to be paid or accrued by the core processor system for the second account;
   m) upon determining that (i) the account criteria data for the designated first account does not meet the qualification criteria for any of the one or more first account rate levels of the reward plan, and (ii) that the account criteria data for the designated first account qualifies for the application of the at least one base rate, instructing the core processor system to apply the at least one base rate to the second account for the accounting period; and
   n) determining how the reward interest earned by the second account should be credited.

2. The method of claim 1, wherein:
in the event the first account meets both (i) the at least one account level qualification criteria and (ii) the at least one account transaction qualification criteria for one of the one or more rate levels for the accounting period, the method further comprises determining whether the first account qualifies for application of a first reward.

3. The method of claim 2, wherein:
the first account is a demand deposit account and the second account is a savings account;
the first reward for the first account comprises periodic reward interest based upon the application of the applicable alternate interest rates of the interest rate plan during the accounting period; and
the method further comprises:
in the event one of any one or more rate levels of the first account fails to meet i) the at least one account level qualification criteria, and ii) the at least one account transaction qualification criteria, determining whether such rate level of the first account qualifies for the application of the first account base interest rate for the applicable tier of the plurality of tiers of the first account during the accounting period.

4. The method of claim 1, wherein the application program is installed on a processor that is part of the core processor system and steps g) thru m) are performed by the core processor system; and the instructing of the core processor system to apply the reward alternate periodic interest rate to the second account in l) includes a first process or routine executing in the core processor system communicating with a second process or routine executing in the core processor system.

5. The method of claim 1, wherein:
the application program is installed on a computer system in electronic communication with the core processor over the communications network and steps g) thru m)

are performed by the application program executing remotely from the core processor system, and if the code has a first logical state, the instruction directs the core processor system to calculate any reward alternate interest, so that the second account nets at least the reward alternate interest for the accounting period, and if the code has a second logical state the instruction directs the core processor system to apply the base interest rate, so that the second account nets at least the base interest rate for the accounting period.

6. The method of claim 1, wherein:
the application program is installed on a computer system in electronic communication with the core processor system over the communications network and steps g) thru m) are performed by the application program executing remotely from the core processor system, and the code reflects a reward alternate interest amount computed by the application program by applying the determined reward alternate interest rate to the applicable portion of the account balance of the second account for the accounting period.

7. The method of claim 1, wherein:
the application program is installed on a computer system in electronic communication with the core processor system for the financial institution over the communications network and steps g) thru m) are performed by the application program executing remotely from the core processor system and the code reflects the reward alternate rate to apply to the second account and the instruction directs the core processor system to apply the reward alternate interest rate to the second account, so that the core processor system computes the reward interest.

8. The method of claim 1, wherein:
the application program is installed on a computer system in electronic communication with the core processor system over the communications network and steps g) thru m) are performed by the application program executing remotely from the core processor system, and the code reflects a selected reward payment formula and the instruction directs the core processor system to apply reward payment formula to the second account.

9. The method of claim 1, wherein:
the application program is installed on a computer system in electronic communication with the core processor system over the communications network and steps g) thru m) are performed by the application program executing remotely from the core processor system, and the code reflects an adjustment amount based upon the reward alternate rate and the instruction directs the core processor system to apply the computed adjustment for the core processor system to apply to an amount already accrued or paid by the core processor system.

10. The method of claim 1, wherein the application program is installed on a computer system electronic communication with the core processor system over the communications network and steps g) thru m) are performed by the program executing remotely from the core processor system and the method includes:

the remotely executing application program determining the reward interest based upon the alternate reward interest rate for the second account; and the remotely executing application program computing a replacement amount responsive to the directing of the calculation in l), wherein the instructing includes the remotely executing application program sending the computed replacement amount to the core processor system for the core processor system to apply as a replacement amount in lieu of an amount already accrued or paid by the core processor system.

11. The method of claim 1, wherein the accounting period is a qualification period, the determining in k) is for the qualification period, and the qualification period corresponds to a statement cycle period.

12. The method of claim 1, wherein the accounting period is a qualification period, the determining in k) is for the qualification period, and the qualification period is asynchronous with respect to a statement cycle period.

13. The method of claim 1, wherein the account level qualification criteria is selected from a group consisting of:
electronic receipt of account statements;
an e-mail address;
previous logging on to an internet website;
meeting a minimum number of debit card transactions;
maintaining a minimum account balance;
meeting a certain number of direct deposits;
performing a number of bill pay transactions;
limiting the number of non-electronic transactions to the account;
referring a friend to the financial institution;
maintaining a qualifying deposit or loan account at the financial institution; and
maintaining a qualifying loan amount.

14. The method of claim 13, wherein the account level qualification criteria comprises at least the criterion of meeting a minimum number of debit transactions.

15. The method of claim 13, wherein the account level qualification criteria is not solely the criterion of maintaining a minimum account balance.

16. The method of claim 13, wherein the account transaction criteria is selected from a group consisting of:
a specified minimum number of debit card transactions;
a specified minimum number of ATM withdrawals;
a specified number of bill pay transactions;
a specified number of direct deposits; and
a specified number of direct debits.

17. A system for applying rewards to accounts at a financial institution, comprising:
a processor in electronic communication with a core processor system for the financial institution; and
a storage device connected to the processor, wherein the storage device has stored thereon (x) an application program for controlling the processor to implement a method of applying rewards to accounts at the financial institution, (y) an accounting period associated with a reward plan; and (z) the reward plan, which includes an interest rate plan for applying interest rates to depository accounts at the financial institution comprising;
i) a plurality of tiers for a first account, wherein each of the tiers correspond to an account balance range,
(ii) a base rate for each tier in the plurality of tiers for the first account,
(iii) one or more rate levels for the first account, wherein
(A) each of the first account rate levels has qualification criteria associated therewith,
(B) the qualification criteria for each of the first account rate levels comprises at least one account level qualification criteria and at least one account transaction qualification criteria, (C) for each first account rate level, each tier in the plurality of tiers has an alternate interest rate, and (D) for each first account rate level, at least a first tier in the plurality of tiers has a first alternate interest rate that is a higher-than-market interest rate;

(iv) a second account linked to the first account, the second account having at least one base rate and at least one rate level with a reward alternate interest rate;

and wherein the processor is operative to execute instructions of the program to implement the method for applying rewards based upon the reward plan to an account at the financial institution, wherein the method comprises:

a) associating the core processor system with a rate type from a plurality of rate types that is suitable for communicating the one or more rate levels to the core processor system;

b) accessing the accounting period associated with the reward plan;

c) accessing the reward plan, including (i) the qualification criteria for the one or more first account rate levels and (ii) the at least one rate level for the second account d) accessing account criteria data for the first account during the accounting period;

e) determining, based upon accessing the account criteria data for the first account, whether the first account at the financial institution meets for the accounting period (i) at least one account level qualification criteria for one of the one or more first account rate levels and (ii) at least one account transaction qualification criteria for one of the one or more of the first account rate levels;

f) determining whether the first account is linked to at least a second account at the financial institution;

g) determining whether the second account is entitled to receive as a reward a periodic interest based upon the reward alternate interest rate in response to the determination that one of the one or more rate levels of the first account has met both the account level qualification criteria and the account transaction criteria for the accounting period;

h) upon determining that the designated first account meets the qualification criteria for one of the one or more first account rate levels, instructing the core processor system to apply the reward alternate interest rate to the second account for the accounting period wherein the instructing includes converting the determined rate level of the second account into a code for transmission to the core processor using the associated rate type, generating an instruction that includes the code, and sending the instruction to the core processor system to adjust the interest to be paid or accrued by the core processor system for the second account;

i) upon determining that (i) the account criteria data for the designated first account does not meet the qualification criteria for any of the one or more first account rate levels of the reward plan, and (ii) that the account criteria data for the designated first account qualifies for the application of the at least one base rate, instructing the core processor system to apply the at least one base rate to the second account for the accounting period; and j) determining how the reward interest earned by the second account should be credited.

18. The system of claim 17, wherein:
the first account is designated to receive a reward based upon the reward plan; and in the event the first account meets both (i) the at least one account level qualification criteria and (ii) the at least one account transaction qualification criteria for one of the one or more rate levels for the accounting period, the method further comprises determining whether the first account qualifies for application of a first reward.

19. The system of claim 18, wherein:
the first account is a demand deposit account and the second account is a savings account;
the first reward for the first account comprises periodic reward interest based upon the application of the applicable alternate interest rates of the interest rate plan during the accounting period; and
the method implemented by the computer executing the instructions of the program further comprises;
in the event one of any one or more rate levels of the first account fails to meet i) the at least one account level qualification criteria and ii) the at least one account transaction qualification criteria, determining whether such rate level of the first account qualifies for the application of the first account base interest rate for the applicable tier of the plurality of tiers of the first account during the accounting period.

20. The system of claim 17, wherein the processor performing the method is part of the core processor system and steps c) thru i) are performed by the core processor system; and the instructing of the core processor system to apply the reward alternate interest rate to the second account in j) includes a first process or routine executing in the core processor system communicating with a second process or routine executing in the core processor system.

21. The system of claim 17, wherein:
the processor performing the method is remote from the core processor system and the instructing in h) includes sending an instruction to the core processor system over a communications network and steps c) thru i) are performed by the application program executing remotely from the core processor system, and
if the code has a first logical state, the instruction directs the core processor system to calculate any reward alternate interest, so that the second account nets at least the reward alternate interest for the accounting period, and if the code has a second logical state, the instruction directs the core processor system to apply the base interest rate, so that the second account nets at least the base interest rate for the accounting period.

22. The system of claim 17, wherein:
the processor performing the method is remote from the core processor system and steps c) thru i) are performed by the application program executing remotely from the core process system, and the code reflects a reward alternate interest amount computed by the application program by applying the determined reward alternate interest rate to the applicable portion of the account balance of the second account for the accounting period.

23. The system of claim 17, wherein the processor performing the method is remote from the core processor system and the instructing in h) includes instructing the core processor system to apply the reward or base interest rates, wherein the core processor system applies the interest rate provided by the instruction in h).

24. The system of claim 17, wherein the processor performing the method is remote from the core processor system and the instructing in h) comprises:

the processor computing an adjustment amount and sending the computed adjustment amount instruction to the core processor system wherein the core processor system applies the adjustment amount to an amount already accrued or paid by the core processor system.

25. The system of claim 17, wherein the processor performing the method is remote from the core processor system and the instructing in h) includes communicating application of an adjustment amount instruction to the core processor system, wherein the adjustment amount adjusts an interest rate downward.

26. The system of claim 17, wherein the accounting period associated with the reward plan is a qualification period, the determining in h) is for the qualification period, and the qualification period corresponds to a statement cycle period.

27. The system of claim 17, wherein the accounting period associated with the reward plan is a qualification period, the determining in g) is for the qualification period, and the qualification period is asynchronous with respect to a statement cycle period.

28. The system of claim 17, wherein the account level qualification criteria is selected from a group consisting of:
electronic receipt of account statements;
an e-mail address;
previous logging on to an internet website;
meeting a minimum number of debit card transactions;
maintaining a minimum account balance;
meeting a certain number of direct deposits;
performing a number of bill pay transactions;
limiting the number of non-electronic transactions to the account;
referring a friend to the financial institution;
maintaining a qualifying deposit or loan account at the financial institution (relationship); and
maintaining a qualifying loan amount.

29. The system of claim 28, wherein the account level qualification criteria comprises at least the criterion of meeting a minimum number of debit transactions.

30. The system of claim 28, wherein the account level qualification criteria is not solely the criterion of maintaining a minimum account balance.

31. The system of claim 28, wherein the one or more account transaction criteria comprises one or more criteria selected from a group consisting of:
a specified minimum number of debit card transactions;
a specified minimum number of ATM withdrawals;
a specified number of bill pay transactions;
a specified number of direct deposits; and
a specified number of direct debits.

32. A computer program product stored on a non-transitory computer readable medium, said computer program product having instructions for execution by a computer system, wherein the instructions, when executed by the computer system in communication with a core processor system for a financial institution, cause the computer system to implement a method for applying rewards to accounts at a financial institution, comprising:
a) providing a reward plan which includes an interest rate plan for applying interest rates to depository accounts at the financial institution, the interest rate plan comprising:
(i) a plurality of tiers for a first account, wherein each of the tiers correspond to an account balance range,
(ii) a base rate for each tier in the plurality of tiers for the first account,
(iii) one or more rate levels for the first account, wherein
(A) each of the first account rate levels has qualification criteria associated therewith,
(B) the qualification criteria for each of the first account rate levels comprises at least one account level qualification criteria and at least one account transaction qualification criteria,
(C) for each first account rate level, each tier in the plurality of tiers has an alternate interest rate, and
(D) for each first account rate level, at least a first tier in the plurality of tiers has a first alternate interest rate that is a higher-than-market interest rate; and
(iv) a second account linked to the first account, the second account having at least one base rate and at least one rate level with a reward alternate interest rate,
b) determining if the second account is linked to the designated first account
c) associating the core processor system with a rate type from a plurality of rate types that is suitable for communicating the one or more rate levels to the core processor system;
d) providing an accounting period associated with the reward plan;
g) accessing the accounting period associated with the reward plan;
h) accessing the reward plan including (i) the qualification criteria for the one or more first account rate levels (ii) the at least one rate level for the second account
i) accessing account criteria data for the first account during the accounting period;
j) determining whether the account criteria data for the designated first account qualifies the first account for a reward for the accounting period;
k) determining whether the account criteria data for the designated first account meets for the accounting period (i) at least one account level qualification criteria for one of the one or more first account rate levels and (ii) at least one account transaction qualification criteria for one of the one or more rate levels;
l) upon determining that the designated first account meets the qualification criteria for one of the one or more first account rate levels, instructing the core processor system to apply the reward alternate interest rate to the second account for the accounting period, wherein the instructing includes converting the determined rate level of the second account into a code for transmission to the core processor using the associated rate type, generating an instruction that includes the code, and sending the instruction to the core processor system to adjust the interest to be paid or accrued by the core processor system for the second account
m) upon determining that (i) the account criteria data for the designated first account does not meet the qualification criteria for any of the one or more first account rate levels of the reward plan, and (ii) that the account criteria data for the designated first account qualifies for the application of the at least one base rate, instructing the core processor system to apply the at least one base rate to the second account for the accounting period; and
n) determining how the reward interest earned by the second account should be credited.

33. A computer-implemented method for applying rewards to depository accounts at a financial institution, the method comprising:

a) providing a reward plan, which includes an interest rate plan for applying interest rates to depository accounts at the financial institution for installation on a computer system, comprising
   (i) a plurality of tiers for a first account, wherein each of the tiers correspond to an account balance range,
   (ii) a non-zero base rate for each tier in the plurality of tiers for the first account,
   (iii) one or more rate levels for the first account, wherein
      (A) each of the first account rate levels has qualification criteria associated therewith,
      (B) the qualification criteria for each of the first account rate levels comprises at least one account level qualification criteria and at least one account transaction qualification criteria,
      (C) for each first account rate level, each tier in the plurality of tiers has an alternate interest rate, and
      (D) for each first account rate level, at least a first tier in the plurality of tiers has a first alternate interest rate that is a higher-than-market interest rate;
   (iv) a second account linked to the first account, the second account having at least one base rate and at least one rate level with a reward alternate interest rate;
b) designating the first account to receive a reward based upon the reward plan;
c) determining if the second account is linked to the designated first account;
d) providing an application program for implementing the method in communication with a core processor system for the financial institution over a communications network;
e) associating the core processor system with a rate type from a plurality of rate types that is suitable for communicating the one or more rate levels to the core processor system;
f) providing at least one memory accessible by the application program that includes:
   (i) the reward plan; and
   (ii) an accounting period associated with the reward plan;
g) accessing, via the application program, the accounting period associated with said reward plan;
h) accessing, via the application program, the reward plan including (i) the qualification criteria for the one of more first account rate levels and (ii) the at least one rate level for the second account;
i) accessing, via the application program, account criteria data for the first account during the accounting period date range;
j) determining whether the account criteria data for the designated first account qualifies for the application of the non-zero base rates for the accounting period to the first account;
k) determining, via the application program, whether the account criteria data for the designated first account meets the qualification criteria for one of the one or more first account rate levels for the accounting period;
l) upon determining that the designated first account meets the qualification criteria for the one of the one or more first account rate levels for the accounting period, instructing the core processor system to apply the reward alternate interest rates for the determined first account one or more rate levels to the first account and instructing the core processor system to apply the reward alternate interest rate of the second account rate level to the linked second account for the accounting period, wherein the instructing includes converting the determined rate level of the second account into a code for transmission to the core processor using the associated rate type, generating an instruction that includes the code, and sending the instruction to the core processor system to adjust the interest to be paid or accrued by the core processor system for the second account;
m) upon determining (i) that the account criteria data for the designated first account does not meet the qualification criteria for any of the one or more rate levels of the interest rate plan, and (ii) that the account criteria data for the first account qualifies for the application of the non-zero base rates, instructing the core processor system to apply the non-zero base rate to the linked second account for the accounting period; and
n) determining how the reward interest earned by the second account should be credited.

34. The method of claim 33, wherein the sending of the instruction included in step l) of claim 33 is selected from the group consisting of:
a) sending an instruction having a rate type comprising a first logical state to the core processor system of a first logical state that directs the core processor system to apply the determined alternate interest rates of the interest rate plan to the applicable portion of the account balance of the accounts for the qualification period;
b) computing an interest transaction amount for the designated accounts by applying the determined alternate interest rates of the interest rate plan to the applicable portion of the account balance of the designated accounts for the qualification cycle and sending an instruction having a rate type for communicating the computed interest transaction amount to the core processor system;
c) sending an instruction having a rate type for instructing to the core processor to apply the determined alternate interest rates of the interest rate plan to the applicable portion of the account balance of the designated accounts in the tier for the qualification cycle;
d) sending an instruction having a rate type notification to the core processor system for notifying the core processor system of the determined alternate interest rates of the interest rate plan to apply to the applicable portion of the account balance of the designated accounts for the qualification cycle;
e) computing an adjustment amount based upon the determined alternate interest rates and sending an instruction having a rate type that communicates the computed interest adjustment amount to the core processor system for the core processor system to apply to an interest amount already accrued or paid by the core processor system;
f) computing a replacement amount based upon the determined alternate interest rates and sending an instruction having a rate type that communicates the computed replacement amount to the core processor system for the core processor system to replace the interest amount already accrued or paid by the core processor system; and
g) directing the program not to send an instruction to the core processor system regarding the application of the determined alternate interest rates of the interest rate plan to the portion of the account balance of the designated accounts for the qualification period.

35. The method of claim 33, wherein all of the determined interest based on applying alternate interest rates to the first and second accounts for the accounting period is credited to the linked second account.

* * * * *